(12) United States Patent
Takeda et al.

(10) Patent No.: US 11,991,672 B2
(45) Date of Patent: May 21, 2024

(54) TERMINAL AND RADIO COMMUNICATION METHOD

(71) Applicant: NTT DOCOMO, INC., Tokyo (JP)

(72) Inventors: Kazuki Takeda, Tokyo (JP); Shohei Yoshioka, Tokyo (JP); Satoshi Nagata, Tokyo (JP); Shaozhen Guo, Beijing (CN); Lihui Wang, Beijing (CN); Xiaolin Hou, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 428 days.

(21) Appl. No.: 17/294,097

(22) PCT Filed: Nov. 11, 2019

(86) PCT No.: PCT/JP2019/044055
§ 371 (c)(1),
(2) Date: May 14, 2021

(87) PCT Pub. No.: WO2020/100787
PCT Pub. Date: May 22, 2020

(65) Prior Publication Data
US 2022/0030591 A1    Jan. 27, 2022

(30) Foreign Application Priority Data

Nov. 16, 2018 (JP) .................................. 2018-228549

(51) Int. Cl.
*H04W 72/0446* (2023.01)
*H04W 72/23* (2023.01)

(52) U.S. Cl.
CPC .............................. *H04W 72/0446* (2013.01)

(58) Field of Classification Search
None
See application file for complete search history.

(56) References Cited

U.S. PATENT DOCUMENTS

| | | | |
|---|---|---|---|
| 2015/0333896 A1* | 11/2015 | Damnjanovic ... | H04W 74/0808 370/277 |
| 2018/0367289 A1* | 12/2018 | Kim ...................... | H04L 5/0078 |
| 2018/0368114 A1* | 12/2018 | Chen ...................... | H04L 5/001 |
| 2018/0368115 A1* | 12/2018 | Li .......................... | H04L 5/0053 |
| 2019/0045495 A1* | 2/2019 | Chen ..................... | H04L 5/0044 |
| 2019/0059084 A1* | 2/2019 | Lee ....................... | H04L 5/0007 |

(Continued)

OTHER PUBLICATIONS

Extended European Search Report issued in counterpart European Patent Application No. 19883680.1, dated Jun. 23, 2022 (9 pages).

(Continued)

*Primary Examiner* — Duc T Duong
(74) *Attorney, Agent, or Firm* — Osha Bergman Watanabe & Burton LLP

(57) ABSTRACT

To properly control half-duplex communication in future radio communication systems, a user terminal according to one aspect of the present disclosure has a receiving section that receives slot format information for designating a slot format of a cell, and a control section that determines a slot format in each cell based on at least one of content designated by each slot format information and a signal type used in transmission of each slot format information, in the case of receiving a plurality of pieces of slot format information.

5 Claims, 9 Drawing Sheets

| | SLOT CONFIGURATION/SLOT FORMAT INDICATOR (SFI) | |
|---|---|---|
| CC1 | D/D' | U/U' |
| CC2 | X/X' | X/X' |
| UE OPERATION | D/D' | U/U' |

D: DL SYMBOL INDICATED BY TDD-UL-DL-Configuration Common or TDD-UL-DL-ConfigDedicated
D': DL SYMBOL INDICATED BY DCI FORMAT 2_0
U: UL SYMBOL INDICATED BY TDD-UL-DL-Configuration Common or TDD-UL-DL-ConfigDedicated
U': UL SYMBOL INDICATED BY DCI FORMAT 2_0
X: FLEXIBLE SYMBOL INDICATED BY TDD-UL-DL-Configuration Common or TDD-UL-DL-ConfigDedicated
X': FLEXIBLE SYMBOL INDICATED BY DCI FORMAT 2_0

(56) References Cited

U.S. PATENT DOCUMENTS

| | | | | |
|---|---|---|---|---|
| 2019/0320419 | A1* | 10/2019 | Sundararajan | H04W 72/23 |
| 2019/0342898 | A1* | 11/2019 | Nam | H04W 72/0446 |
| 2020/0029317 | A1* | 1/2020 | Nam | H04W 72/23 |
| 2020/0045696 | A1* | 2/2020 | Huang | H04L 5/10 |
| 2020/0053728 | A1* | 2/2020 | Huang | H04L 27/26025 |
| 2020/0170010 | A1* | 5/2020 | Luo | H04W 72/0446 |
| 2020/0260442 | A1* | 8/2020 | Yi | H04W 72/23 |
| 2020/0287676 | A1* | 9/2020 | Jo | H04L 5/0048 |

OTHER PUBLICATIONS

NTT Docomo, Inc.; "Maintenance for Physical downlink control channel"; 3GPP TSG RAN WG1 Meeting #94bis, R1-1811373; Chengdu, China, Oct. 8-12, 2018 (18 pages).
Nokia, Nokia Shanghai Bell; "Maintenance for DL control"; 3GPP TSG RAN WG1 Meeting #95, R1-1813149; Spokane, USA, Nov. 12-16, 2018 (7 pages).
Office Action issued in Chinese Application 201980088384.8, dated Apr. 27, 2023 (16 pages).
3GPP TS 36.300 V8.12.0 "3rd Generation Partnership Project; Technical Specification Group Radio Access Network; Evolved Universal Terrestrial Radio Access (E-UTRA) and Evolved Universal Terrestrial Radio Access Network (EUTRAN); Overall description; Stage 2 (Release 8)" Mar. 2010 (149 pages).
3GPP TSG RAN WG1 #95; R1-1814030 "Summary of GC-PDCCH carrying SFI" Qualcomm Incorporated; Spokane, USA; Nov. 12-16, 2018 (3 pages).
3GPP TSG RAN WG1 #93; R1-1807812 "Summary on offline discussion of GC-PDCCH carrying SFI" Qualcomm Incorporated; Busan, Korea; May 21-25, 2018 (7 pages).
International Search Report issued in International Application No. PCT/JP2019/044055, dated Jan. 28, 2020 (3 bages).
Written Opinion issued in International Application No. PCT/JP2019/044055; dated Jan. 28, 2020 (3 pages).
Office Action issued in Chinese Application No. 201980088384.8; dated Sep. 21, 2023 (16 pages).

* cited by examiner

| Format | Symbol number in a slot | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | F | F | F | F | F | F | F | F | F | F | F | F | F | F |
| 3 | D | D | D | D | D | D | D | D | D | D | D | D | D | F |
| 4 | D | D | D | D | D | D | D | D | D | D | D | D | F | F |
| 5 | D | D | D | D | D | D | D | D | D | D | D | F | F | F |
| 6 | D | D | D | D | D | D | D | D | D | D | F | F | F | F |
| 7 | D | D | D | D | D | D | D | D | D | F | F | F | F | F |
| 8 | F | F | F | F | F | F | F | F | F | F | F | F | F | U |
| 9 | F | F | F | F | F | F | F | F | F | F | F | F | U | U |
| 10 | F | U | U | U | U | U | U | U | U | U | U | U | U | U |
| 11 | F | F | U | U | U | U | U | U | U | U | U | U | U | U |
| 12 | F | F | F | U | U | U | U | U | U | U | U | U | U | U |
| 13 | F | F | F | F | U | U | U | U | U | U | U | U | U | U |
| 14 | F | F | F | F | F | U | U | U | U | U | U | U | U | U |
| 15 | F | F | F | F | F | F | U | U | U | U | U | U | U | U |
| 16 | D | F | F | F | F | F | F | F | F | F | F | F | F | F |
| 17 | D | D | F | F | F | F | F | F | F | F | F | F | F | F |
| 18 | D | D | D | F | F | F | F | F | F | F | F | F | F | F |
| 19 | D | D | D | D | F | F | F | F | F | F | F | F | F | F |
| 20 | D | D | D | D | D | F | F | F | F | F | F | F | F | F |
| 21 | D | D | D | D | D | D | F | F | F | F | F | F | F | F |
| 22 | D | F | F | F | F | F | F | F | F | F | F | F | F | U |
| 23 | D | D | F | F | F | F | F | F | F | F | F | F | F | U |
| 24 | D | D | D | F | F | F | F | F | F | F | F | F | F | U |
| 25 | D | D | D | D | F | F | F | F | F | F | F | F | F | U |
| 26 | D | D | D | D | D | F | F | F | F | F | F | F | F | U |
| 27 | D | D | D | D | D | D | F | F | F | F | F | F | F | U |
| 28 | D | D | D | D | D | D | D | D | D | D | D | D | F | U |
| 29 | D | D | D | D | D | D | D | D | D | D | D | F | F | U |
| 30 | D | D | D | D | D | D | D | D | D | D | F | F | F | U |
| 31 | D | D | D | D | D | D | D | D | D | D | D | F | U | U |
| 32 | D | D | D | D | D | D | D | D | D | D | F | F | U | U |
| 33 | D | D | D | D | D | D | D | D | D | F | F | F | U | U |
| 34 | D | F | U | U | U | U | U | U | U | U | U | U | U | U |
| 35 | D | D | F | U | U | U | U | U | U | U | U | U | U | U |
| 36 | D | D | D | F | U | U | U | U | U | U | U | U | U | U |
| 37 | D | F | F | U | U | U | U | U | U | U | U | U | U | U |
| 38 | D | D | F | F | U | U | U | U | U | U | U | U | U | U |
| 39 | D | D | D | F | F | U | U | U | U | U | U | U | U | U |
| 40 | D | F | F | F | U | U | U | U | U | U | U | U | U | U |
| 41 | D | D | F | F | F | U | U | U | U | U | U | U | U | U |
| 42 | D | D | D | F | F | F | U | U | U | U | U | U | U | U |
| 43 | D | D | D | D | D | D | D | D | D | F | F | F | F | U |
| 44 | D | D | D | D | D | D | F | F | F | F | F | F | U | U |
| 45 | D | D | D | D | D | D | F | F | U | U | U | U | U | U |
| 46 | D | D | D | D | D | F | U | D | D | D | D | D | F | U |
| 47 | D | D | F | U | U | U | U | D | D | F | U | U | U | U |
| 48 | D | F | U | U | U | U | U | D | F | U | U | U | U | U |
| 49 | D | D | D | D | F | F | U | D | D | D | D | F | F | U |
| 50 | D | D | F | F | U | U | U | D | D | F | F | U | U | U |
| 51 | D | F | F | U | U | U | U | D | F | F | U | U | U | U |
| 52 | D | F | F | F | F | F | U | D | F | F | F | F | F | U |
| 53 | D | D | F | F | F | F | U | D | D | F | F | F | F | U |
| 54 | F | F | F | F | F | F | F | D | D | D | D | D | D | D |
| 55 | D | D | F | F | F | U | U | U | D | D | D | D | D | D |
| 56 – 254 | Reserved | | | | | | | | | | | | | |
| 255 | UE determines the slot format for the slot based on TDD-UL-DL-ConfigurationCommon, or TDD-UL-DL-ConfigDedicated and, if any, on detected DCI formats | | | | | | | | | | | | | |

FIG. 1

| SLOT CONFIGURATION/SLOT FORMAT INDICATOR (SFI) | |
|---|---|
| CC1 | D/D' |
| CC2 | X/X' |
| UE OPERATION | D/D' |

| SLOT CONFIGURATION/SLOT FORMAT INDICATOR (SFI) | |
|---|---|
| CC1 | U/U' |
| CC2 | X/X' |
| UE OPERATION | U/U' |

D: DL SYMBOL INDICATED BY TDD-UL-DL-Configuration Common or TDD-UL-DL-ConfigDedicated
D': DL SYMBOL INDICATED BY DCI FORMAT 2_0
U: UL SYMBOL INDICATED BY TDD-UL-DL-Configuration Common or TDD-UL-DL-ConfigDedicated
U': UL SYMBOL INDICATED BY DCI FORMAT 2_0
X: FLEXIBLE SYMBOL INDICATED BY TDD-UL-DL-Configuration Common or TDD-UL-DL-ConfigDedicated
X': FLEXIBLE SYMBOL INDICATED BY DCI FORMAT 2_0

FIG. 2

|  | | | |
|---|---|---|---|
| CC1 | DYNAMICALLY SCHEDULED DL | Dedicated configuring reception | X |
| CC2 | X | Dedicated configuring transmission | Dedicated configuring transmission/ reception |
| CC2 | DYNAMICALLY SCHEDULED UL | | DYNAMICALLY SCHEDULED DL/UL |
| UE OPERATION | ERROR CASE | ERROR CASE | DYNAMICALLY SCHEDULED DL/UL |

X: FLEXIBLE SYMBOL INDICATED BY TDD-UL-DL-Configuration Common or TDD-UL-DL-ConfigDedicated

FIG. 3

| | | | |
|---|---|---|---|
| CC1 | DYNAMICALLY SCHEDULED DL | X' | Dedicated configuring transmission/reception |
| | | Dedicated configuring transmission | |
| CC2 | DYNAMICALLY SCHEDULED UL | X' | DYNAMICALLY SCHEDULED DL/UL |
| | | Dedicated configuring reception | |
| UE OPERATION | ERROR CASE | ERROR CASE | DYNAMICALLY SCHEDULED DL/UL |

X': FLEXIBLE SYMBOL INDICATED BY DCI FORMAT 2_0

FIG. 4

| | | | | |
|---|---|---|---|---|
| CC1 | DYNAMICALLY SCHEDULED DL/UL | Dedicated configuring transmission/reception | X | DYNAMICALLY SCHEDULED DL/UL |
| CC2 | DYNAMICALLY SCHEDULED UL/DL | Dedicated configuring reception/transmission | X' | DYNAMICALLY SCHEDULED DL/UL |
| | | Dedicated configuring transmission/reception | Dedicated configuring transmission/reception | |
| UE OPERATION | ERROR CASE | Dedicated configuring transmission/reception | DYNAMICALLY SCHEDULED DL/UL | DYNAMICALLY SCHEDULED DL/UL (or ERROR CASE) |

X: FLEXIBLE SYMBOL INDICATED BY TDD-UL-DL-Configuration Common or TDD-UL-DL-ConfigDedicated
X': FLEXIBLE SYMBOL INDICATED BY DCI FORMAT 2_0

FIG. 5

TERMINAL AND RADIO COMMUNICATION METHOD

TECHNICAL FIELD

The present disclosure relates to a terminal and radio communication method in the next-generation mobile communication system.

BACKGROUND ART

In Universal Mobile Telecommunications System (UMTS) networks, for the purpose of higher data rates, low delay and the like, Long Term Evolution (LTE) has been specified (Non-patent Document 1). Further, for the purpose of higher capacity, more sophistication and the like than LTE (Third Generation Partnership Project (3GPP) Release (Rel.) 8, 9), LTE-Advanced (3GPP Rel. 10-14) has been specified.

Successor systems (e.g., also referred to as 5th generation mobile communication system (5G), 5G+(plus), New Radio (NR), 3GPP Rel. 15 onward, etc.) to LTE have also been studied.

In the existing LTE system (e.g., LTE Rel.10 onward), in order to achieve wider bands, carrier aggregation (CA) for aggregating a plurality of carriers (Component Carrier (CC), cell) is introduced. Each carrier is configured with a system band of LTE Rel.8 as one unit. Further, in CA, a plurality of CCs of the same radio base station (eNB: eNodeB) is configured at a user terminal (UE: User Equipment).

In the existing LTE system (e.g., LTE Rel.12 onward), dual connectivity (DC) is also introduced where a plurality of cell groups (CG: Cell Group) of different radio base stations is configured at a user terminal. Each cell group is comprised of at least one carrier (CC, cell). Since a plurality of carriers of different radio base stations is aggregated, DC is also called inter-base station CA (Inter-eNB CA) and the like.

In the existing LTE system (e.g., prior to LTE Rel.14) is introduced Time Division Duplex (TDD) for switching temporally between downlink (DL) transmission and uplink (UL) transmission to perform and Frequency Division Duplex (FDD) for performing DL transmission and UL transmission at different frequency bands.

In TDD, since DL communication and UL communication is switched temporally at the same frequency band, TDD is a half-duplex communication scheme where only one of transmission and reception is performed at some time band. In FDD, since DL communication and UL communication is performed at different frequency bands, and according to the capability of the user terminal, FDD is a full-duplex communication scheme where transmission and reception is capable of being concurrently performed at some time band, as well as the half-duplex communication scheme.

PRIOR ART DOCUMENT

Non-Patent Document

[Non-patent Document 1] 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)", April, 2010

DISCLOSURE OF INVENTION

Problems to be Solved by the Invention

TDD in the existing LTE system is the configuration for switching between UL and DL on a subframe-by-subframe basis, and in contrast thereto, future radio communication systems (hereinafter, also described as NR) support also a configuration for switching between UL and DL on a symbol-by-symbol basis. In this case, it is a problem how to control half-duplex communication.

Therefore, in the present disclosure, it is an object to provide a terminal and radio communication method capable of properly controlling half-duplex communication in future radio communication systems.

Means for Solving the Problem

A terminal according to one aspect of the present disclosure is characterized by having a receiving section that receives slot format information for designating (indicating) a slot format of a cell, and a control section that determines a slot format in each cell based on at least one of content designated by each slot format information and a signal type used in transmission of each slot format information, in the case of receiving a plurality of pieces of slot format information.

Advantageous Effect of the Invention

According to one aspect of the present disclosure, it is possible to properly control half-duplex communication in future radio communication systems.

BRIEF DESCRIPTION OF DRAWINGS

FIG. 1 is a diagram showing one example of a table used for a base station to notify UE of information about slot formats using DCI;

FIG. 2 is a diagram showing one example in the case of configuring different slot formats for a plurality of cells;

FIG. 3 is a diagram showing one example of transmission/reception control in the case of configuring flexible for a plurality of cells;

FIG. 4 is a diagram showing another example of transmission/reception control in the case of configuring flexible for a plurality of cells;

FIG. 5 is a diagram showing still another example of transmission/reception control in the case of configuring flexible for a plurality of cells;

BEST MODE FOR CARRYING OUT THE INVENTION

Figure 6:
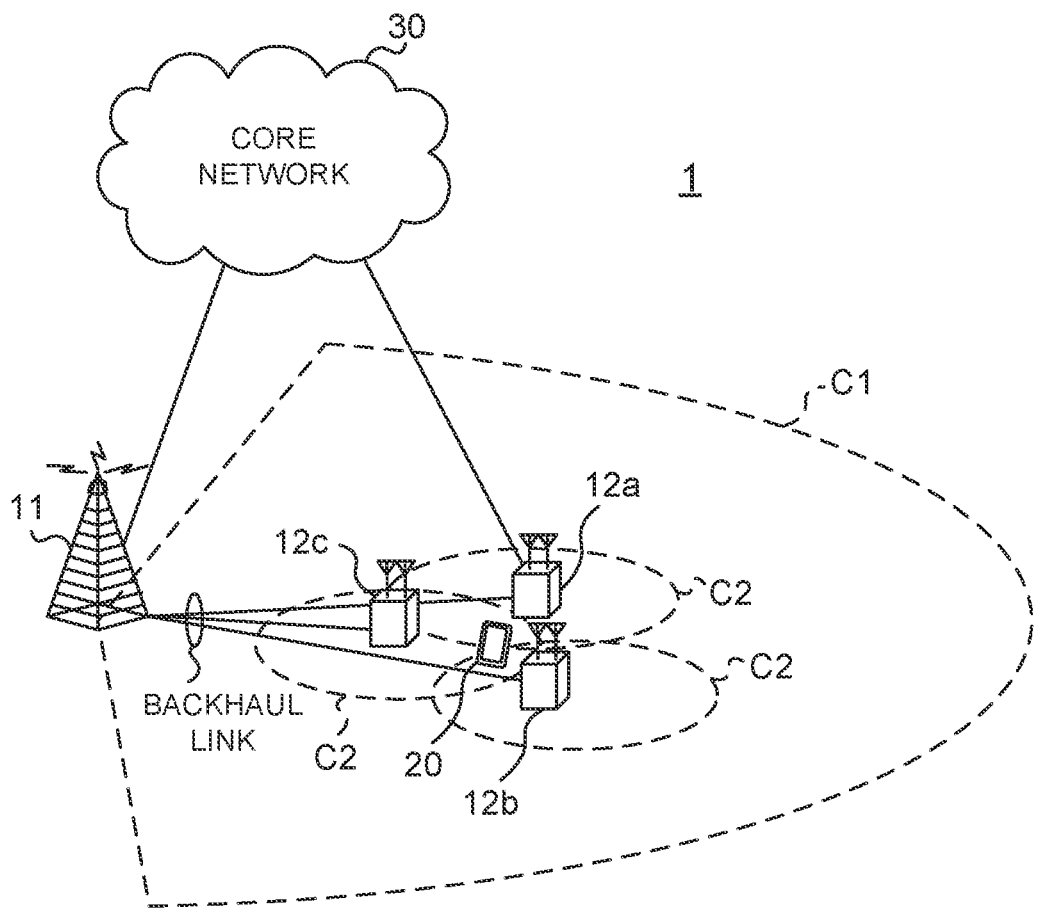
FIG. 6 is a diagram showing one example of a schematic configuration of a radio communication system according to one Embodiment.

In the existing LTE system (e.g., prior to LTE Rel.14), as configurations of UL transmission and DL transmission, for example, FDD (also called frame configuration type 1) and TDD (also called frame configuration type 2) are defined.

In the frame configuration type 1 (FDD), for example, in a radio frame (time interval of 10 ms), it is possible to perform DL transmission of 10 subframes and UL transmission of 10 subframes. DL transmission and UL transmission each of 10 subframes is executed by separating mutual frequency regions.

In FDD, in the case of applying full-duplex communication, a UE is capable of simultaneously performing UL transmission and DL reception. On the other hand, in the case of applying half-duplex communication in FDD (e.g., in the case of not supporting full-duplex communication), the UE is not capable of simultaneously performing reception and transmission of a DL signal and a UL signal.

In the frame configuration type 2 (TDD), UL transmission and DL reception is performed by switching in the same frequency region, and a gap (GP) period is configured in switching between DL and UL. In the case of performing communication (e.g., using carrier aggregation) using a plurality of cells in TDD, the UE assumes that guard periods of particular subframes between cells overlap each other for a given period.

Further, in the case where different UL/DL configurations are applied in a plurality of cells applying CA, and a UE is not provided with the capability of simultaneous reception and transmission for the plurality of cells, the UE performs the following operation in subframes with different UL/DL configurations.

In the case where a subframe of a primary cell is a DL subframe (subframe of a secondary cell is a UL subframe), the UE does not transmit any signal or channel in the secondary cell.

In the case where a subframe of a primary cell is a UL subframe (subframe of a secondary cell is a DL subframe), the UE does not assume that a DL signal is received in the secondary cell.

In the case where a subframe of a primary cell is a particular subframe and a subframe of a secondary cell is a DL subframe, the UE does not assume reception of a given channel and signal in the secondary cell, and in an OFDM symbol of the secondary cell overlapping a guide period of the primary cell or UpPTS (Uplink Pilot Time Slot), does not assume reception of the other channel and signal either.

In addition, the given channel and signal may be at least one of a PDSCH (Physical Downlink Shared Channel), EPDCCH (Enhanced Physical Downlink Control Channel), PMCH (Physical Multicast Channel) and PRS (Positioning Reference Signal). Further, the other channel and signal may be a broadcast signal, paging channel or the like.

Further, NR supports a configuration for switching between UL and DL to control, by changing slot formats on a basis of a symbol constituting the subframe, as a substitute for a subframe basis as in existing LTE.

For example, a base station transmits information about slot formats to a UE. Based on the information about slot formats transmitted from the base station, the UE determines a transmission direction of each symbol in the slot to control transmission and reception. The base station may notify the UE of the information about slot formats, using higher layer signaling (e.g., at least one of tdd-UL-DL-Configuration Common, tdd-UL-DL-configuration Common 2, and tdd-UL-DL ConfigDedicated). Alternatively, the base station may notify the UE of the information about slot formats, using downlink control information (e.g., Slot Format Indicator (SFI)). The DCI used in notification of the information (slot format information) about slot formats may be DCI format 2_0.

The information about slot formats may include "U" indicative of UL transmission, "D" indicative of DL transmission, and "F" (or, "X") indicative of flexible not to designate either of UL transmission and DL transmission. FIG. 1 shows one example of a table used for a base station to notify a UE of information (e.g., also called SFI) about slot formats using DCI. The UE may determine a slot format based on bit information included in the DCI transmitted from the base station and the table of FIG. 1.

In addition, in NR, it is supported to change slot formats on a basis of the symbol constituting the subframe, as a substitute for the subframe basis as in existing LTE, and in such a case, it is a problem how to control half-duplex communication.

For example, it is a problem how a UE that does not support full-duplex communication controls DL reception and UL transmission in the same cell (or, another cell (e.g., neighboring cell)).

For example, the case (e.g., CA) is also considered where a UE for performing half-duplex communication (e.g., UE that does not support full-duplex communication) performs communication using a plurality of cells (or, CCs). In this case, it is also considered that the slot format is configured in each cell individually. For example, in the case where the base station transmits the information about slot formats for each of the plurality of given cells, a case may occur where the slot format information corresponding to each cell is notified differently.

For a period during which a different slot format is configured in each cell, it is a problem how to control UE operation (e.g., transmission and reception). Further, in the case where flexible (F) is configured as the slot format of each cell in a given period, it is a problem how to control UE operation (e.g., transmission and reception) in each cell.

Therefore, the inventors of the present invention conceived controlling slot formats used in each cell, based on content (or, type) of the slot format configured in each cell. Alternatively, in the case of configuring flexible in each cell for a given period, the inventors of the invention conceived controlling transmission and reception based on at least one of content (e.g., transmission direction) of transmission and reception indicated in each cell for the given period, a method of indicating transmission and reception (e.g., signal type), and a method of indicating the slot format (e.g., signal type).

Embodiments according to the present disclosure will be described below in detail with reference to drawings. Each of the Embodiments may be applied alone, or may be applied in combination. In the following description, information about the SFI may be transmitted from a base station to a UE, using at least one of higher layer signaling (e.g., at least one of tdd-UL-DL-Configuration Common, tdd-UL-DL-configuration Common 2, and tdd-UL-DL ConfigDedicated), and downlink control information (e.g. SFI).

In addition, the following description is suitably applicable to the UE for performing half-duplex communication (or, the UE that does not support full-duplex communication), but is not limited thereto. Further, the UE for performing half-duplex communication may be read with the UE that does not support full-duplex communication, a UE that does not simultaneously support DL reception and UL transmission in Inter Band CA, or a UE that does not simultaneously support reception and transmission for CA band combination including SUL. Further, the UE that does not support full-duplex communication may be read with a UE that does not report that full-duplex communication is supported.

(Aspect 1)

In Aspect 1, the UE determines slot formats in a plurality of cells, based on given slot format information notified from the base station. Notification of the slot format information may be performed based on higher layer signaling (e.g., at least one of tdd-UL-DL-Configuration Common, tdd-UL-DL-configuration Common 2, and tdd-UL-DL ConfigDedicated) and DCI (e.g., Slot Format Indicator (SFI)).

For example, for a combination of serving cells where a UE does not support full-duplex communication (or, a UE does not report the full-duplex capability), the UE may determine a slot format of each cell based on given slot format information. For example, in the case where a given symbol (or, symbol in a given period) in the serving cell is designated as DL by the slot format information, the UE may assume DL also for the other serving cells to perform reception processing.

Alternatively, in the case where a given symbol (or, symbol in a given period) in the serving cell is designated as UL by the slot format information, the UE may assume UL also for the other serving cells to perform reception processing.

Further, the UE may assume that different slot formats (e.g., UL and DL) for a plurality of cells are not designated in the same period. In addition, it may be permitted that UL and flexible or DL and flexible are respectively configured for different cells. In this case, the UE may assume that the slot format of the cell configured at flexible is UL or DL to control transmission and reception (see FIG. 2).

For example, in a given period (e.g., given symbol period), the case is assumed where the slot format of a CC #1 is configured at DL, and the slot format of a CC #2 is configured at flexible. In such a case, the UE may assume that DL is configured in the CC #1 and CC #2. The slot format may be configured at the UE by the higher layer signaling or DCI. Alternatively, in the case where the slot format information is not notified, the UE may assume that flexible is configured.

Further, in a given period, the case is assumed where the slot format of a CC #1 is configured at UL, and the slot format of a CC #2 is configured at flexible. In such a case, the UE may also assume that DL is configured in the CC #1 and CC #2.

Thus, by assigning priorities to the content of the slot format information, also in the case where different slot formats are configured in a plurality of cells, it is possible to properly perform half-duplex communication.

(Aspect 2)

Aspect 2 describes transmission/reception control in the case where flexible is configured in each of a plurality of cells.

In the case where flexible is configured for a plurality of cells to which a UE does not report that the UE has the full-duplex capability (or, simultaneous UL transmission-DL reception capability), the UE may control transmission and reception in each cell based on a given condition. The given condition may be at least one of a transmission direction indicative of transmission/reception, and a method of indicating (e.g., configuration, scheduling or the like) transmission and reception.

The base station may configure the slot format of each cell at flexible, using at least one of the higher layer signaling and the DCI for each cell. In the case where the slot format information notified from the base station is flexible for a given period, or the base station does not notify of the slot format information for a given period, the UE may determine that the given period is flexible.

FIG. 3 shows one example of UE operation in the case of configuring a CC #1 and CC #2 at flexible for a given period (e.g., one symbol or a plurality of symbols).

Herein, the case is shown where the CC #1 and CC #2 are configured at flexible using the higher layer signaling. In the CC #1 and CC #2, in the case of configuring (or scheduling) transmission or reception of the same direction, the UE may perform transmission and reception in each cell.

In the CC #1 and CC #2, the UE may assume that scheduling with different transmission directions is not indicated. For example, the UE may not assume that DL reception is scheduled in the CC #1, and that UL transmission is scheduled in the CC #2. Alternatively, the UE may not assume that UL transmission is scheduled in the CC #1, and that DL reception is scheduled in the CC #2. Scheduling of DL reception or UL transmission may be dynamically scheduled by the DCI.

UL transmission dynamically scheduled by the DCI may be transmission of SRS, PUSCH, PUCCH or PRACH. Further, UL transmission may be indicated by DCI format 0_0, DCI format 0_1, DCI format 1_0, DCI format 1_1, DCI format 2_3, or the UL grant for random access response.

DL reception dynamically scheduled by the DCI may be reception of PDSCH or CSI-RS. Further, DL reception may be DCI format 1_0, DCI format 1_1, and DCI format 0_1.

In addition, in the CC #1 and CC #2, in the case where scheduling with different transmission directions is indicated, the UE may assume as an error case. Further, in the CC #1 and CC #2, in the case where scheduling with different transmission directions is indicated, the UE may perform transmission/reception operation of a given cell based on a given condition, and may control not to perform transmission/reception operation of the other cell. The given condition may be a CC index, scheduling order by DCI and the like. As one example, the UE may give a priority to transmission/reception operation of a cell low in CC index, or a cell scheduled later in the time domain.

Alternatively, in the CC #1 and CC #2, the UE may assume that transmission or reception is not configured at the same time. For example, the UE may not assume that reception (e.g., dedicated configuring reception) is configured in the CC #1, and that transmission (e.g., dedicated configuring transmission) is configured in the CC #2. Dedicated configuring transmission or dedicated configuring reception may be transmission/reception operation configured in Semi Persistent Scheduling (SPS), or configuration grant-based transmission operation.

In addition, in the CC #1 and CC #2, in the case where transmission and reception with different transmission directions is configured, the UE may assume as an error case. Further, in the CC #1 and CC #2, in the case where transmission and reception with different transmission directions is configured, the UE may perform transmission/reception operation of a given cell based on a given condition, and may control not to perform transmission/reception operation of the other cell. The given condition may be the CC index, scheduling order by DCI and the like. As one example, the UE may give a priority to transmission/reception operation of a cell low in CC index, or a cell scheduled later in the time domain.

Alternatively, in the CC #1 and CC #2, in the case where transmission or reception with different transmission directions is indicated, the UE may control transmission/reception in each cell based on the method of indicating the transmission or the reception. For example, for a given period, in the case where the transmission directions are different between a cell dynamically scheduled by DCI, and a cell configured by higher layer signaling (or, MAC signaling), the UE may give a priority to one of the cells (or, transmission indication) to apply.

For example, the case is assumed where UL (e.g., dedicated configuring transmission) is configured for the CC #1 by RRC signaling, and DL reception (e.g., PDSCH or CSI-RS) is scheduled for the CC #2 by DCI. In this case, the UE performs DL reception scheduled by the DCI, and controls not to perform UL transmission (e.g., dedicated configuring transmission).

Alternatively, the case is assumed where DL (e.g., dedicated configuring reception) is configured for the CC #1 by RRC signaling, and UL transmission (e.g., SRS, PUSCH, PUCCH orb PRACH) is scheduled for the CC #2 by DCI. In this case, the UE performs UL transmission scheduled by the DCI, and controls not to perform DL reception (E.g., dedicated configuring transmission).

In addition, FIG. 3 illustrates the case where slot formats (flexible) of the CC #1 and CC #2 are indicated by the higher layer signaling, and also in the case where slot formats (flexible) of the CC #1 and CC #2 are indicated by the DCI (see FIG. 4), UE operation may be similarly controlled.

Thus, in the case where flexible is configured for a plurality of cells in a given period, transmission and reception with different transmission directions is not configured for different cells, or in the case where transmission and reception with different transmission directions is configured for different cells, transmission is controlled based on the given condition. By this means, it is possible to properly perform half-duplex communication.

(Aspect 3)

Aspect 3 describes transmission/reception control in the case where flexible is configured for a plurality of cells by different methods.

In the case where flexible is configured for a plurality of cells to which a UE does not report that the UE has the full-duplex capability (or, simultaneous UL transmission-DL reception capability), there is the case of configuring by higher layer signaling or DCI. In such a case, the UE may control transmission and reception in each cell, based on a method of indicating the slot format (flexible).

In the case where flexible is configured at the CC #1 by higher layer signaling, and is configured at the CC #2 by DCI, one example of transmission/reception control will be described below with reference to FIG. 5.

Control 1

The UE may assume that scheduling with different transmission directions is not indicated in the CC #1 and CC #2. For example, the UE may not assume that DL reception is scheduled in the CC #1, and that UL transmission is scheduled in the CC #2. Alternatively, the UE may not assume that UL transmission is scheduled in the CC #1, and that DL reception is scheduled in the CC #2. Scheduling of DL reception or UL transmission may be scheduled dynamically by DCI.

UL transmission dynamically scheduled by the DCI may be transmission of SRS, PUSCH, PUCCH or PRACH. Further, UL transmission may be indicated by DCI format 0_0, DCI format 0_1, DCI format 1_0, DCI format 1_1, DCI format 2_3, or the UL grant for random access response.

DL reception dynamically scheduled by the DCI may be reception of PDSCH, or CSI-RS. Further, DL reception may be DCI format 1_0, DCI format 1_1, and DCI format 0_1.

In addition, in the CC #1 and CC #2, in the case where scheduling with different transmission directions is indicated, the UE may assume as an error case. Further, in the CC #1 and CC #2, in the case where scheduling with different transmission directions is indicated, the UE may perform transmission/reception operation of a given cell based on a given condition, and may control not to perform transmission/reception operation of the other cell. The given condition may be the CC index, scheduling order by DCI and the like. As one example, the UE may give a priority to transmission/reception operation of a cell low in CC index, or a cell scheduled later in the time domain.

Control Example 2

In the CC #11 and CC #2, in the case where transmission or reception is configured simultaneously, the UE may control to apply one, while not applying the other one. For example, the UE gives a higher priority to transmission/reception of a cell where the slot format (flexible) is configured by higher layer signaling than transmission/reception of a cell configured by DCI to apply.

For example, in a given period (e.g., symbol set), in the case where transmission (e.g., dedicated configuring transmission) is configured at the CC #1, and reception (e.g., dedicated configuring reception) is configured at the CC #2, the UE may control to perform transmission configured at the CC #1 in the symbol set.

Alternatively, in a given period (e.g., symbol set), in the case where reception (e.g., dedicated configuring reception) is configured at the CC #1, and transmission (e.g., dedicated configuring transmission) is configured at the CC #2, the UE may control to perform reception configured at the CC #1 in the symbol set.

By assigning a priority to transmission/reception configured (or, scheduled) in a cell where the slot format is configured by the higher layer signaling (e.g., RRC signaling), it is possible to reserve a preparation period of transmission/reception in the UE. In addition, the UE may assign a higher priority to transmission/reception of a cell where the slot format (flexible) is configured by the DCI than transmission/reception of a cell configured by the higher layer signaling to apply.

Control Example 3

In the CC #1 and CC #2, in the case where transmission or reception with different transmission directions is indicated, the UE may control transmission/reception in each cell based on the method of indicating the transmission or the reception. For example, in a given period, in the case where the transmission direction is different between a cell dynamically scheduled by DCI, and a cell configured by higher layer signaling (or, MAC signaling), one of the cells (or, transmission indication) may be given a higher priority and applied. As one example, the transmission/reception scheduled by the DCI may be given a higher priority.

For example, in a given period (e.g., symbol set), the case is assumed where DL (e.g., dedicated configuring reception) is configured for the CC #1 by the RRC signaling, and UL transmission (e.g., SRS, PUSCH, PUCCH or PRACH) is scheduled for the CC #2 by the DCI. In this case, the UE performs the UL transmission scheduled by the DCI in one or more symbols in the symbol set, and controls not to perform DL reception (e.g., dedicated configuring transmission).

Alternatively, the case is assumed where UL (e.g., dedicated configuring transmission) is configured for the CC #1 by the RRC signaling, and DL reception (e.g., PDSCH or CSI-RS) is scheduled for the CC #2 by the DCI. In this case, the UE performs the DL reception scheduled by the DCI in one or more symbols in the symbol set, and controls not to perform UL transmission (e.g., dedicated configuring transmission).

Control Example 4

In a given period (e.g., symbol set), the case is assumed where DL reception (e.g., PDSCH or CSI-RS) is scheduled for the CC #1 by DCI, and UL (e.g., dedicated configuring transmission) is scheduled for the CC #2 by the RRC signaling. In this case, the UE performs the DL reception scheduled by the DCI in one or more symbols included in the symbol set of the slot, and controls not to perform UL transmission (e.g., dedicated configuring transmission).

Otherwise, the UE may assume (or determine as an error case) that such configurations are not made.

Alternatively, the case is assumed where UL transmission (e.g., SRS, PUSCH, PUCCH or PRACH) is scheduled for the CC #1 by the DCI, and DL (e.g., dedicated configuring reception) is configured for the CC #2 by the RRC signaling. In this case, the UE performs the UL transmission scheduled by the DCI in one or more symbols included in the symbol set of the slot, and controls not to perform DL reception (e.g., dedicated configuring transmission).

Otherwise, the UE may assume (or determine as an error case) that such configurations are not made.
(Radio Communication System)

A configuration of a radio communication system according to one Embodiment of the present disclosure will be described below. In the radio communication system, communication is performed by using one of radio communication methods according to the respective above-mentioned Embodiments of the disclosure or combination thereof.

FIG. 6 is a diagram showing one example of a schematic configuration of the radio communication system according to one Embodiment. The radio communication system 1 may be a system for actualizing communication using Long Term Evolution (LTE), 5th generation mobile communication system New Radio (5G NR) and the like specified by Third Generation Partnership Project (3GPP).

Further, the radio communication system 1 may support dual connectivity (Multi-RAT Dual Connectivity (MR-DC)) among a plurality of Radio Access Technologies (RAT). The MR-DC may include dual connectivity (E-UTRA-NR Dual Connectivity (EN-DC)) between LTE (Evolved Universal Terrestrial Radio Access (E-UTRA)) and NR, dual connectivity (NR-E-UTRA Dual Connectivity (NE-DC)) between NR and LTE, and the like.

In EN-DC, a base station (eNB) of LTE (E-UTRA) is a master node (Master Node (MN)), and a base station (gNB) of NR is a secondary node (SecondaryNode (SN)). In NE-DC, a base station (gNB) of NR is an MN, and a base station (gNB) of LTE (E-UTRA) is an SN.

The radio communication system 1 may support dual connectivity (e.g., dual connectivity (NR-NR Dual Connectivity (NN-DC)) where both of the MN and SN are the base stations (gNB) of NR) among a plurality of base stations in the same RAT.

The radio communication system 1 may be provided with a base station 11 for forming a macrocell C1 with relatively wide coverage, and base stations 12 (12a to 12c) disposed inside the macrocell C1 to form small cells C2 narrower than the macrocell C1. A user terminal 20 may be positioned in at least one cell. The arrangement, numbers and the like of each cell and user terminal 20 are not limited to the aspect shown in the figure. Hereinafter, in the case of not distinguishing between the base stations 11 and 12, the stations are collectively called a base station 10.

The user terminal 20 may connect to at least one of a plurality of base stations 10. The user terminal 20 may use at least one of carrier aggregation (Carrier Aggregation (CA)) using a plurality of component carriers (Component Carrier (CC)) and dual connectivity (DC).

Each CC may be included in at least one of a first frequency band (Frequency Range 1 (FR1)) and second frequency band (Frequency Range 2 (FR2)). The macrocell C1 may be included in the FR1, and the small cell C2 may be included in the FR2. For example, the FR1 may be a frequency band (sub-6 GHz) of 6 GHz or less, and the FR2 may be a high frequency band (above-24 GHz) higher than 24 GHz. In addition, the frequency bands, definitions and the like of the FR1 and FR2 are not limited thereto, and for example, the FR1 may correspond to a frequency band higher than the FR2.

Further, in each CC, the user terminal 20 may perform communication using at least one of Time Division Duplex (TDD) and Frequency Division Duplex (FDD).

A plurality of base stations 10 may be connected by cables (e.g., optical fiber in conformity with Common Public Radio Interface (CPRI), X2 interface, etc.), or by radio (e.g., NR communication). For example, in the case of using NR communication as backhaul between the base stations 11 and 12, the base station 11 corresponding to a higher station may be called an Integrated Access Backhaul (IAB) donor, and the base station 12 corresponding to a relay station (relay) may be called an IAB node.

The base station 10 may be connected to a core network 30 via another base station 10 or directly. For example, the core network 30 may include at least one of Evolved PacketCore (EPC), 5G Core Network (5GCN), Next Generation Core (NGC) and the like.

The user terminal 20 may be a terminal supporting at least one of communication schemes such as LTE, LTE-A, and 5G.

In the radio communication system 1, an Orthogonal Frequency Division Multiplexing (OFDM)-based radio access scheme may be used. For example, on at least one of downlink (Downlink (DL)) and uplink (Uplink (UL)) may be used Cyclic Prefix OFDM (CP-OFDM), Discrete Fourier Transform Spread OFDM (DFT-s-OFDM), Orthogonal Frequency Division Multiple Access (OFDMA), Single Carrier Frequency Division Multiple Access (SC-FDMA) and the like.

The radio access scheme may be called a waveform. In addition, in the radio communication system 1, another radio access scheme (e.g., another single carrier transmission scheme, another multi-carrier transmission scheme) may be used for the radio access scheme of UL and DL.

As downlink channels, in the radio communication system 1 may be used a downlink shared channel (Physical Downlink Shared Channel (PDSCH)) shared by user terminals 20, broadcast channel (Physical Broadcast Channel (PBCH)), downlink control channel (Physical Downlink Control Channel (PDCCH)) and the like.

Further, as uplink channels, in the radio communication system 1 may be used an uplink shared channel (Physical Uplink Shared Channel (PUSCH)) shared by user terminals 20, uplink control channel (Physical Uplink Control Channel (PUCCH)), random access channel (Physical Random Access Channel (PRACH)) and the like.

User data, higher layer control information, System Information Block (SIB) and the like are transmitted on the PDSCH. The user data, higher layer control information and the like may be transmitted on the PUSCH. Further, Master Information Block (MIB) may be transmitted on the PBCH.

Lower layer control information may be transmitted on the PDCCH. For example, the lower layer control information may include downlink control information (Downlink Control Information (DCI)) including scheduling information of at least one of the PDSCH and PUSCH.

In addition, DCI for scheduling the PDSCH may be called a DL assignment, DL DCI and the like, and DCI for scheduling the PUSCH may be called a UL grant, UL DCI and the like. In addition, the PDSCH may be read with DL data, and the PUSCH may be read with UL data.

For detection of the PDCCH, a control resource set (COntorl REsource SET (CORESET)) and search space may be used. The CORESET corresponds to resources to search for the DCI. The search space corresponds to a search region and search method of PDCCH candidates. One CORESET may be associated with one or a plurality of search spaces. The UE may monitor the CORESET related to some search space based on search space configuration.

One search space may correspond to PDCCH candidates corresponding to one or a plurality of aggregation levels. One or a plurality of search spaces may be called a search space set. In addition, the "search space", "search space set", "search space configuration", "search space set configuration", "CORESET", "CORESET configuration" and the like of the present disclosure may be read with one another.

For example, on the PUCCH may be transmitted uplink control information (Uplink Control Information (UCI)) including at least one of Channel State Information (CSI), receipt confirmation information (for example, which may be called Hybrid Automatic Repeat reQuest ACKnowledgement (HARQ-ACK), ACK/NACK and the like) and Scheduling Request (SR). A random access preamble to establish connection with the cell may be transmitted on the PRACH.

In addition, in the present disclosure, the downlink, uplink and the like may be expressed without attaching "link". Further, various channels may be expressed without attaching "Physical" at the beginning.

In the radio communication system 1 may be transmitted a Synchronization Signal (SS), Downlink Reference Signal (DL-RS) and the like. As the DL-RS, in the radio communication system 1 may be transmitted a Cell-specific Reference Signal (CRS), Channel State Information Reference Signal (CSI-RS), demodulation reference signal (DeModulation Reference Signal (DMRS)), Positioning Reference signal (PRS), Phase Tracking Reference Signal (PTRS) and the like.

For example, the synchronization signal may be at least one of a Primary Synchronization Signal (PSS) and Secondary Synchronization Signal (SSS) A signal block including the SS (PSS, SSS) and PBCH (and DMRS for the PBCH) may be called an SS/PBCH block, SS Block (SSB) and the like. In addition, the SS, SSB and the like may also be called the reference signal.

Further, in the radio communication system 1, a Sounding Reference Signal (SRS), demodulation reference signal (DMRS) and the like may be transmitted as an Uplink Reference Signal (UL-RS). In addition, the DMRS may be called a user terminal-specific reference signal (UE-specific Reference Signal).

(Base Station)

Figure 7:
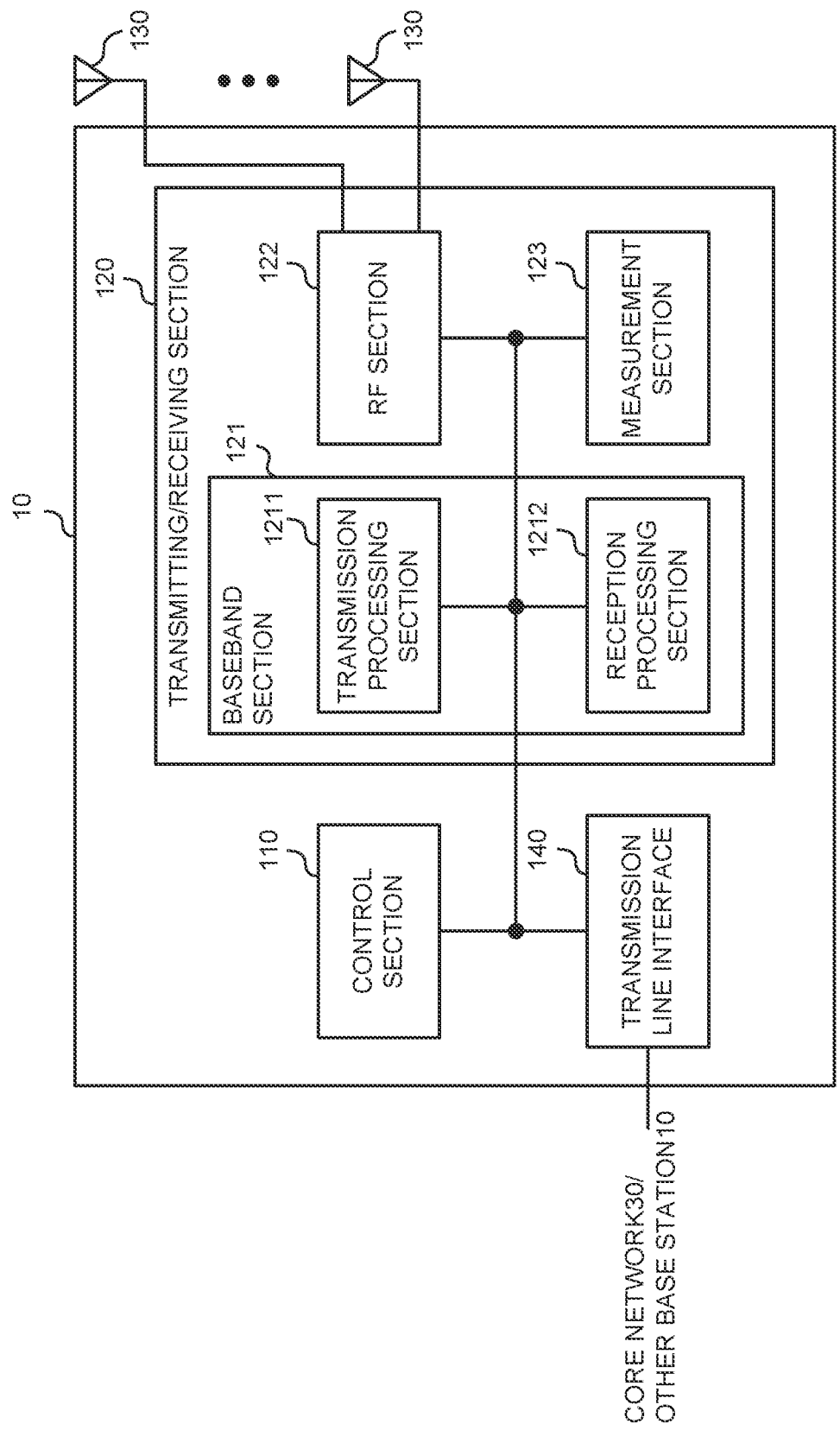
FIG. 7 is a diagram showing one example of a configuration of a base station according to one Embodiment.

FIG. 7 is a diagram showing one example of a configuration of the base station according to one Embodiment. The base station 10 is provided with a control section 110, transmitting/receiving section 120, transmitting/receiving antennas 130, and transmission line interface 140. In addition, the base station may be provided with one or more of each of the control section 110, transmitting/receiving section 120, transmitting/receiving antenna 130, and transmission line interface 140.

In addition, this example mainly illustrates function blocks of feature parts in this Embodiment, and the base station 10 may be assumed to have other function blocks required for radio communication. A part of processing of each section described below may be omitted.

The control section 110 performs control of the entire base station 10. The control section 110 is capable of being comprised of a controller, control circuit and the like explained based on common recognition in the technical field according to the present disclosure.

The control section 110 may control generation of signals, scheduling (e.g., resource allocation, mapping) and the like. The control section 110 may control transmission/reception, measurement and the like using the transmitting/receiving section 120, transmitting/receiving antenna 130 and transmission line interface 140. The control section 110 may generate data, control information, sequence and the like to transmit as a signal, and transfer the resultant to the transmitting/receiving section 120. The control section 110 may perform call processing (configuration, release, etc.) of a communication channel, state management of the base station 10, management of radio resources and the like.

The transmitting/receiving section 120 may include a baseband section 121, Radio Frequency (RF) section 122 and measurement section 123. The baseband section 121 may include a transmission processing section 1211 and reception processing section 1212. The transmitting/receiving section 120 is capable of being comprised of a transmitter/receiver, RF circuit, baseband circuit, filter, phase shifter, measurement circuit, transmitting/receiving circuit and the like explained based on the common recognition in the technical field according to the present disclosure.

The transmitting/receiving section 120 may be comprised as an integrated transmitting/receiving section, or may be comprised of a transmitting section and a receiving section. The transmitting section may be comprised of a transmission processing section 1211 and RF section 122. The receiving section may be comprised of a reception processing section 1212, RF section 122, and measurement section 123.

The transmitting/receiving antenna 130 is capable of being comprised of an antenna, for example, an array antenna and the like explained based on the common recognition in the technical field according to the present disclosure.

The transmitting/receiving section 120 may transmit the above-mentioned downlink channel, synchronization signal, downlink reference signal and the like. The transmitting/receiving section 120 may receive the above-mentioned uplink channel, uplink reference signal and the like.

The transmitting/receiving section 120 may form at least one of a transmission beam and reception beam, using digital beam forming (e.g., precoding), analog beam forming (e.g., phase rotation) and the like.

The transmitting/receiving section 120 (transmission processing section 1211) may perform, for example, on the data, control information and the like acquired from the control section 110, processing of Packet Data Convergence Protocol (PDCP) layer, processing (e.g., RLC retransmission control) of Radio Link Control (RLC) layer, processing (e.g., HARQ retransmission control) of Medium Access Control (MAC) layer and the like to generate a bit sequence to transmit.

The transmitting/receiving section 120 (transmission processing section 1211) may perform, on the bit sequence to transmit, transmission processing such as channel coding (which may include error correcting coding), modulation, mapping, filter processing, Discrete Fourier Transform (DFT) processing (as necessary), Inverse Fast Fourier Transform (IFFT) processing, precoding and digital-analog conversion, and output a baseband signal.

The transmitting/receiving section 120 (FR section 122) may perform modulation to a radio frequency band, filter processing, amplification and the like on the baseband signal to transmit a signal of the radio frequency band via the transmitting/receiving antenna 130.

On the other hand, the transmitting/receiving section 120 (RF section 122) may perform amplification, filter processing, demodulation to a baseband signal and the like on a signal of the radio frequency band received by the transmitting/receiving antenna 130.

The transmitting/receiving section 120 (reception processing section 1212) may apply reception processing such as analog-digital conversion, Fast Fourier Transform (FTT) processing, Inverse Discrete Fourier Transform (IDFT) processing (as necessary), filter processing, demapping, demodulation, decoding (which may include error correcting decoding), MAC layer processing, processing of RCL layer, and processing of PDCP layer to the acquired baseband signal, and acquire the user data, and the like.

The transmitting/receiving section 120 (measurement section 123) may perform measurement on a received signal. For example, based on the received signal, the measurement section 123 may perform Radio Resource Management (RRM) measurement, Channel State Information (CSI) measurement and the like. The measurement section 123 may measure received power (e.g., Reference Signal Received Power (RSRP)), received quality (e.g., Reference Signal Received Quality (RSRQ), Signal to Interference plus Noise Ratio (SINR), Signal to Noise Ratio (SNR)), signal strength (e.g., Received Signal Strength Indicator (RSSI)), propagation path information (e.g., CSI) and the like. The measurement result may be output to the control section 110.

The transmission line interface 140 may transmit/receive signals (backhaul signaling) to/from an apparatus included in the core network 30, another base station 10 and the like to perform acquisition, transmission and the like of user data (user plain data), control plain data and the like for the user terminal 20.

In addition, the transmitting section and receiving section of the base station 10 in the present disclosure may be comprised of at least one of the transmitting/receiving section 120, transmitting/receiving antenna 130 and transmission line interface 140.

In addition, the transmitting/receiving section 120 may transmit the slot format information for designating (indicating) the slot format of the cell, using at least one of higher layer signaling (e.g., RRC signaling) and DCI.

The control section 110 may control the slot format configured at each cell. Further, the control section 110 may control UL transmission or DL reception of each cell based on the slot format configured at each cell.

(User Terminal)

Figure 8:
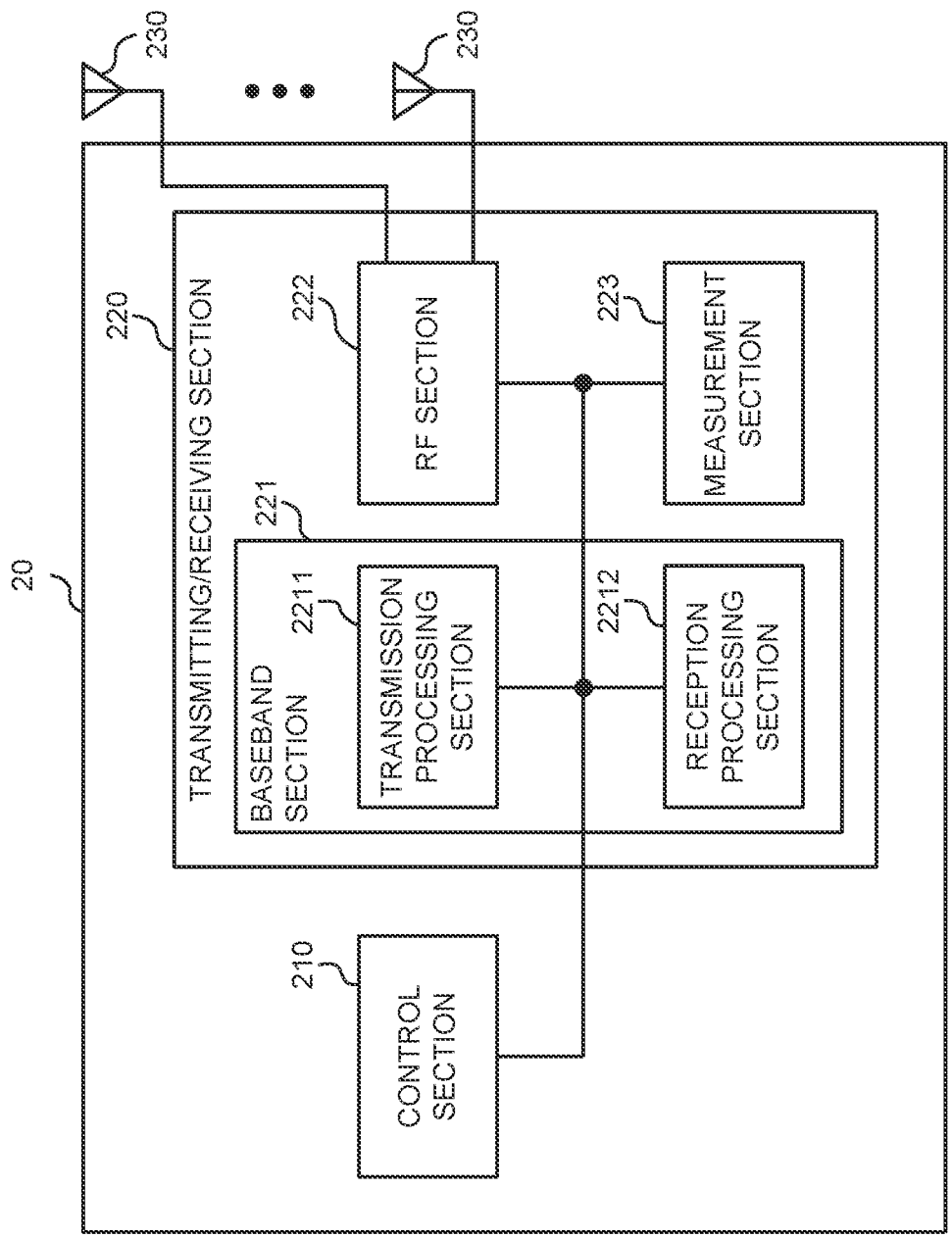
FIG. 8 is a diagram showing one example of a configuration of a user terminal according to one Embodiment.

FIG. 8 is a diagram showing one example of a configuration of the user terminal according to one Embodiment. The user terminal 20 is provided with a control section 210, transmitting/receiving section 220, and transmitting/receiving antennas 230. In addition, the user terminal may be provided with one or more of each of the control section 210, transmitting/receiving section 220 and transmitting/receiving antenna 230.

In addition, this example mainly illustrates function blocks of feature parts in this Embodiment, and the user terminal 20 may be assumed to have other function blocks required for radio communication. A part of processing of each section described below may be omitted.

The control section 210 performs control of the entire user terminal 20. The control section 210 is capable of being comprised of a controller, control circuit and the like explained based on the common recognition in the technical field according to the present disclosure.

The control section 210 may control generation of signals, mapping and the like. The control section 210 may control transmission/reception, measurement and the like using the transmitting/receiving section 220 and transmitting/receiving antenna 230. The control section 210 may generate data, control information, sequence and the like to transmit as a signal, and transfer the resultant to the transmitting/receiving section 220.

The transmitting/receiving section 220 may include a baseband section 221, RF section 222 and measurement section 223. The baseband section 221 may include a transmission processing section 2211 and reception processing section 2212. The transmitting/receiving section 220 is capable of being comprised of a transmitter/receiver, RF circuit, baseband circuit, filter, phase shifter, measurement circuit, transmitting/receiving circuit and the like explained based on the common recognition in the technical field according to the present disclosure.

The transmitting/receiving section 220 may be comprised as an integrated transmitting/receiving section, or may be comprised of a transmitting section and a receiving section. The transmitting section may be comprised of a transmission processing section 2211 and RF section 222. The receiving section may be comprised of a reception processing section 2212, RF section 222, and measurement section 223.

The transmitting/receiving antenna 230 is capable of being comprised of an antenna, for example, an array antenna and the like explained based on the common recognition in the technical field according to the present disclosure.

The transmitting/receiving section 220 may receive the above-mentioned downlink channel, synchronization signal, downlink reference signal and the like. The transmitting/receiving section 220 may transmit the above-mentioned uplink channel, uplink reference signal and the like.

The transmitting/receiving section 220 may form at least one of a transmission beam and reception beam, using digital beam forming (e.g., precoding), analog beam forming (e.g., phase rotation) and the like.

The transmitting/receiving section 220 (transmission processing section 2211) may perform, for example, on the data, control information and the like acquired from the control section 210, processing of PDCP layer, processing (e.g., RLC retransmission control) of RLC layer, processing (e.g., HARQ retransmission control) of MAC layer and the like to generate a bit sequence to transmit.

The transmitting/receiving section 220 (transmission processing section 2211) may perform, on the bit sequence to transmit, transmission processing such as channel coding (which may include error correcting coding), modulation, mapping, filter processing, DFT processing (as necessary), IFFT processing, precoding and digital-analog conversion, and output a baseband signal.

In addition, whether or not to apply the DFT processing may be based on configuration of transform precoding. In the case where transform precoding is enabled on some channel (e.g., PUSCH), the transmitting/receiving section 220 (transmission processing section 2211) may perform the DFT processing as the above-mentioned transmission processing so as to transmit the channel using a DFT-s-OFDM waveform. In the other case, the section may not perform the DFT processing as the above-mentioned transmission processing.

The transmitting/receiving section 220 (FR section 222) may perform modulation to a radio frequency band, filter processing, amplification and the like on the baseband signal to transmit a signal of the radio frequency band via the transmitting/receiving antenna 230.

On the other hand, the transmitting/receiving section 220 (RF section 222) may perform amplification, filter processing, demodulation to a baseband signal and the like on a signal of the radio frequency band received by the transmitting/receiving antenna 230.

The transmitting/receiving section 220 (reception processing section 2212) may apply reception processing such as analog-digital conversion, FTT processing, IDFT processing (as necessary), filter processing, demapping, demodulation, decoding (which may include error correcting decoding), MAC layer processing, processing of RCL layer, and processing of PDCP layer to the acquired baseband signal, and acquire the user data, and the like.

The transmitting/receiving section 220 (measurement section 223) may perform measurement on a received signal. For example, based on the received signal, the measurement section 223 may perform RRM measurement, CSI measurement and the like. The measurement section 223 may measure received power (e.g., RSRP), received quality (e.g., RSRQ, SINR, SNR), signal strength (e.g., RSSI), propagation path information (e.g., CSI) and the like. The measurement result may be output to the control section 210.

In addition, the transmitting section and receiving section of the user terminal 20 in the present disclosure may be comprised of at least one of the transmitting/receiving section 220, transmitting/receiving antenna 230 and transmission line interface 240.

In addition, the transmitting/receiving section 220 may receive the slot format information for designating the slot format of the cell. Te transmitting/receiving section 220 may receive DCI for scheduling UL transmission or DL reception of each cell or higher layer signaling for configuring UL or DL of each cell.

In the case of receiving a plurality of pieces of slot format information, the control section 210 may determine the slot format in each cell, based on at least one of content designated by each slot format information and a signal type used in transmission of each slot format information.

Further, for a given period during which the slot format of each cell is configured at flexible, the control section 210 may assume that transmission and reception with different transmission directions is not configured in each cell.

Alternatively, for a period during which the slot format of each cell is configured at flexible, the control section 210 may control transmission and reception in each cell, based on at least one of a signal type used in indication of transmission and reception, and another signal type used in transmission of each slot format information.

(Hardware Configuration)

In addition, the block diagrams used in explanation of the above-mentioned Embodiment show blocks on a function-by-function basis. These function blocks (configuration sections) are actualized by any combination of at least one of hardware and software. Further, the method for actualizing each function block is not limited particularly. In other words, each function block may be actualized using a single apparatus combined physically and/or logically, or two or more apparatuses that are separated physically and/or logically are connected directly and/or indirectly (e.g., using cable, radio, etc.), and each function block may be actualized using a plurality of these apparatuses. The function block may be actualized by combining the above-mentioned one apparatus or the above-mentioned plurality of apparatuses and software.

Herein, the function includes judging, determining, deciding, calculating, computing, processing, deriving, investigating, searching, ascertaining, receiving, transmitting, outputting, accessing, resolving, selecting, choosing, establishing, comparing, assuming, expecting, considering, broadcasting, notifying, communicating, forwarding, configuring, reconfiguring, allocating, mapping, assigning and the like, but is not limited thereto. For example, the function block (configuration section) having the function of transmitting may be called a transmitting unit, transmitter and the like. In any case, as described above, the actualizing method is not limited particularly.

Figure 9:
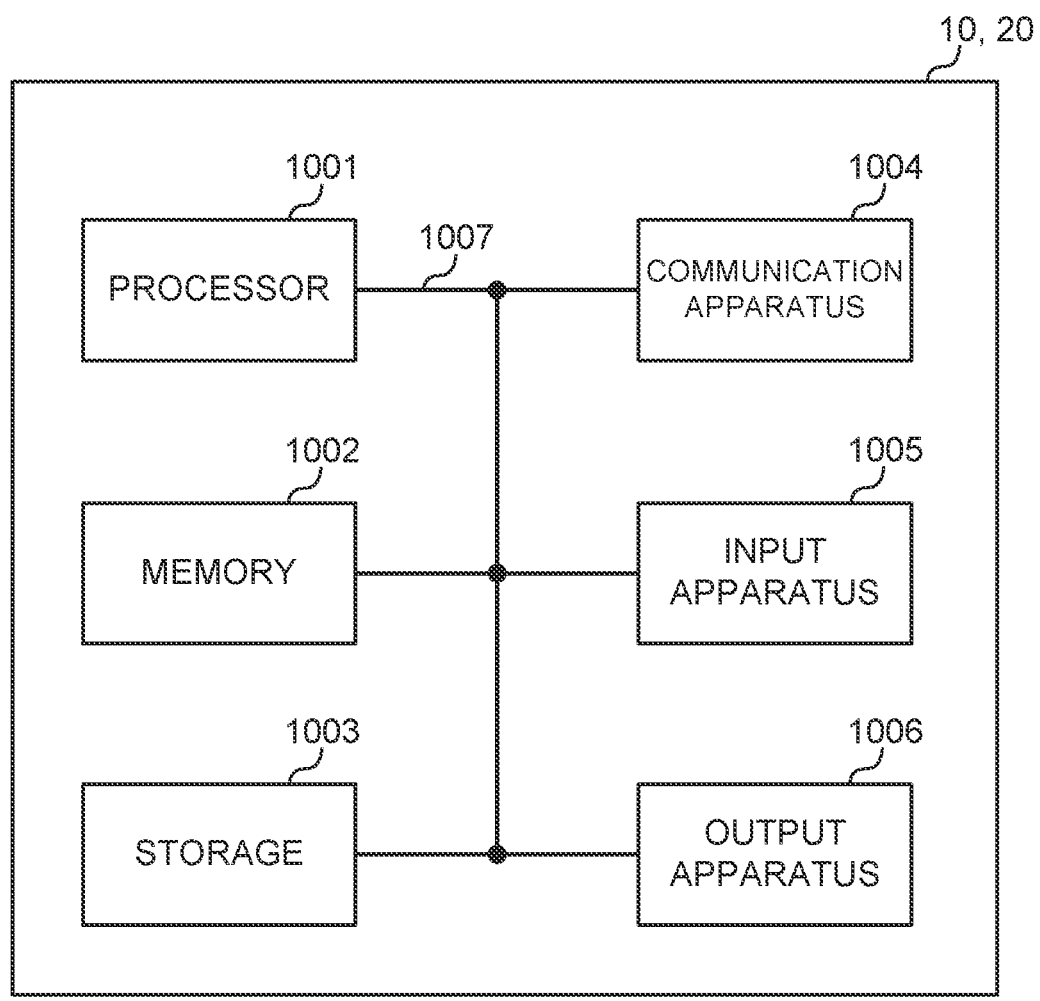
FIG. 9 is a diagram showing one example of hardware configurations of the base station and user terminal according to one Embodiment.

For example, each of the base station, user terminal and the like in one Embodiment of the present disclosure may function as a computer that performs the processing of the radio communication method of the disclosure. FIG. 9 is a diagram showing one example of a hardware configuration of each of the base station and user terminal according to one Embodiment. Each of the base station 10 and user terminal 20 as described above may be physically configured as a computer apparatus including a processor 1001, memory 1002, storage 1003, communication apparatus 1004, input apparatus 1005, output apparatus 1006, bus 1007 and the like.

In addition, in the present disclosure, it is possible to read the letter of apparatus, circuit, device, section, unit and the like with one another. With respect to each apparatus shown in the figure, the hardware configuration of each of the base station 10 and the user terminal 20 may be configured so as to include one or a plurality of apparatuses, or may be configured without including a part of apparatuses.

For example, a single processor 1001 is shown in the figure, but a plurality of processors may exist. Further, the processing may be executed by a single processor, or may be executed by one or more processors at the same time, sequentially or using another technique. In addition, the processor 1001 may be implemented on one or more chips.

For example, each function in the base station 10 and user terminal 20 is actualized in a manner such that predetermined software (program) is read on the hardware of the processor 1001, memory 1002 and the like, and that the processor 1001 thereby performs computations, and controls communication via the communication apparatus 1004, and at least one of read and write of data in the memory 1002 and storage 1003.

For example, the processor 1001 operates an operating system to control the entire computer. The processor 1001 may be comprised of a Central Processing Unit (CPU)

including interfaces with peripheral apparatuses, control apparatus, computation apparatus, register and the like. For example, at least a part of the above-mentioned control section 110 (210), transmitting/receiving section 120 (220) and the like may be actualized by the processor 1001.

Further, the processor 1001 reads the program (program code), software module, data and the like on the memory 1002 from at least one of the storage 1003 and the communication apparatus 1004, and according thereto, executes various kinds of processing. Used as the program is a program that causes the computer to execute at least a part of operation described in the above-mentioned Embodiment. For example, the control section 110 (210) may be actualized by a control program stored in the memory 1002 to operate in the processor 1001, and the other function blocks may be actualized similarly.

The memory 1002 is a computer-readable storage medium, and for example, may be comprised of at least one of Read Only Memory (ROM), Erasable Programmable ROM (EPROM), Electrically EPROM (EEPROM), Random Access Memory (RAM) and other proper storage media. The memory 1002 may be called the register, cache, main memory (main storage apparatus) and the like. The memory 1002 is capable of storing the program (program code), software module and the like executable to implement the radio communication method according to one Embodiment of the present disclosure.

The storage 1003 is a computer-readable storage medium, and for example, may be comprised of at least one of a flexible disk, floppy (Registered Trademark) disk, magneto-optical disk (e.g., compact disk (Compact Disc ROM (CD-ROM), etc.), digital multi-purpose disk, Blu-ray (Registered Trademark) disk), removable disk, hard disk drive, smart card, flash memory device (e.g., card, stick, key drive), magnetic stripe, database, server and other proper storage media. The storage 1003 may be called an auxiliary storage apparatus.

The communication apparatus 1004 is hardware (transmitting/receiving device) to perform communication between computers via at least one of a wired network and a wireless network, and for example, is also referred to as a network device, network controller, network card, communication module and the like. For example, in order to actualize at least one of Frequency Division Duplex (FDD) and Time Division Duplex (TDD), the communication apparatus 1004 may be comprised by including a high-frequency switch, duplexer, filter, frequency synthesizer and the like. For example, the transmitting/receiving section 120 (220), transmitting/receiving antenna 130 (230) and the like as described above may be actualized by the communication apparatus 1004. The transmitting/receiving section 120 (220) may be made by physically or logically separated implementation using a transmitting section 120a (220a) and receiving section 120b (220b).

The input apparatus 1005 is an input device (e.g., keyboard, mouse, microphone, switch, button, sensor, etc.) that receives input from the outside. The output apparatus 1006 is an output device (e.g., display, speaker, Light Emitting Diode (LED) lamp, etc.) that performs output to the outside. In addition, the input apparatus 1005 and output apparatus 1006 may be an integrated configuration (e.g., touch panel).

Further, each apparatus of the processor 1001, memory 1002 and the like is connected on the bus 1007 to communicate information. The bus 1007 may be configured using a single bus, or may be configured using different buses between apparatuses.

Furthermore, each of the base station 10 and user terminal 20 may be configured by including hardware such as a microprocessor, Digital Signal Processor (DSP), Application Specific Integrated Circuit (ASIC), Programmable Logic Device (PLD), and Field Programmable Gate Array (FPGA), or a part or the whole of each function block may be actualized using the hardware. For example, the processor 1001 may be implemented using at least one of the hardware.

(Modification)

In addition, the term explained in the present disclosure and the term required to understand the present disclosure may be replaced with a term having the same or similar meaning. For example, the channel, symbol and signal (or signaling) may be read with one another.

Further, the signal may be a message. The reference signal is capable of being abbreviated as RS, and according to the standard to apply, may be called a pilot, pilot signal and the like. Furthermore, the component carrier (CC) may be called a cell, frequency carrier, carrier frequency and the like.

A radio frame may be comprised of one or a plurality of frames in the time domain. The one or each of the plurality of frames constituting the radio frame may be called a subframe. Further, the subframe may be comprised of one or a plurality of slots in the time domain. The subframe may be a fixed time length (e.g., 1 ms) that is not dependent on numerology.

Herein, the numerology may be a communication parameter applied to at least one of transmission and reception of some signal or channel. For example, the numerology may indicate at least one of SubCarrier Spacing (SCS), bandwidth, symbol length, cyclic prefix length, Transmission Time Interval (TTI), the number of symbols per TTI, radio frame configuration, particular filtering processing performed by a transmitter/receiver in the frequency domain, particular windowing processing performed by a transmitter/receiver in the time domain and the like.

The slot may be comprised of one or a plurality of symbols (Orthogonal Frequency Division Multiplexing (OFDM) symbols, Single Carrier Frequency Division Multiple Access (SC-FDMA) symbols and the like) in the time domain. Further, the slot may a time unit based on numerology.

The slot may include a plurality of mini-slots. Each mini-slot may be comprised of one or a plurality of symbols in the time domain. Further, the mini-slot may be called a subslot. The mini-slot may be comprised of the number of symbols lower than the slot. A PDSCH (or PUSCH) transmitted in a time unit larger than the mini-slot may be called PDSCH (PUSCH) mapping type A. A PDSCH (or PUSCH) transmitted using the mini-slot may be called PDSCH (PUSCH) mapping type B.

Each of the radio frame, subframe, slot, mini-slot and symbol represents a time unit in transmitting a signal. For the radio frame, subframe, slot, mini-slot and symbol, another name corresponding to each of them may be used. The time units such as the frame, subframe, slot, mini-slot and symbol in the present disclosure may be read with one another.

For example, one subframe may be called TTI, a plurality of contiguous subframes may be called TTI, or one slot or one mini-slot may be called TTI. In other words, at least one of the subframe and TTI may be the subframe (1 ms) in existing LTE, may be a frame (e.g., 1 to 13 symbols) shorter than 1 ms, or may be a frame longer than 1 ms. In addition, instead of the subframe, the unit representing the TTI may be called the slot, mini-slot and the like.

Herein, for example, the TTI refers to a minimum time unit of scheduling in radio communication. For example, in the LTE system, the base station performs scheduling for allocating radio resources (frequency bandwidth, transmit power and the like capable of being used in each user terminal) to each user terminal in a TTI unit. In addition, the definition of the TTI is not limited thereto.

The TTI may be a transmission time unit of a data packet (transport block) subjected to channel coding, code block, codeword and the like, or may be a processing unit of scheduling, link adaptation and the like. In addition, when the TTI is given, a time segment (e.g., the number of symbols) to which the transport block, code block, codeword and the like are actually mapped may be shorter than the TTI.

In addition, when one slot or one mini-slot is called the TTI, one or more TTIs (i.e., one or more slots, or one or more mini-slots) may be the minimum time unit of scheduling. Further, the number of slots (the number of mini-slots) constituting the minimum time unit of scheduling may be controlled.

The TTI having a time length of 1 ms may be called ordinary TTI (TTI in 3GPP LTE Rel.8-12), normal TTI, long TTI, ordinary subframe, normal subframe, long subframe, slot and the like. The TTI shorter than the ordinary TTI may be called shortened TTI, short TTI, partial or fractional TTI, shortened subframe, short subframe, mini-slot, subslot, slot and the like.

In addition, the long TTI (e.g., ordinary TTI, subframe, etc.) may be read with TTI having a time length exceeding 1 ms, and the short TTI (e.g., shortened TTI, etc.) may be read with TTI having a TTI length of 1 ms or more and less than the TTI length of the long TTI.

The resource block (RB) is a resource allocation unit in the time domain and frequency domain, and may include one or a plurality of contiguous subcarriers in the frequency domain. The number of subcarriers contained in the RB may be the same irrespective of the numerology, and for example, may be "12". The number of subcarriers contained in the RB may be determined based on the numerology Further, the RB may include one or a plurality of symbols in the time domain, and may be a length of 1 slot, 1 mini-slot, 1 subcarrier, or 1 TTI. Each of 1 TTI and 1 subframe may be comprised of one or a plurality of resource blocks.

In addition, one or a plurality of RBs may be called a physical resource block (Physical RB (PRB)), subcarrier group (Sub-Carrier Group (SCG)), Resource Element Group (REG), PRB pair, RB pair and the like.

Further, the resource block may be comprised of one or a plurality of resource elements (Resource Element (RE)). For example, 1 RE may be a radio resource region of 1 subcarrier and 1 symbol.

A Bandwidth Part (BWP) (which may be called a partial bandwidth, etc.) may represent a subset of contiguous common RBs (common resource blocks) for some numerology in some carrier. Herein, the common RB may be identified by an index of the RB with a common reference point of the carrier as reference. The PRB may be defined by some BWP, and may be numbered within the BWP.

The BWP may include UL BWP (BWP for UL) and DL BWP (BWP for DL). For a UE, one or a plurality of BWPs may be configured within one carrier.

At least one of configured BWPs may be active, and the UE may not assume that a given signal/channel is transmitted and received outside the active BWP. In addition, the "cell", "carrier" and the like in the present disclosure may be read with the "BWP".

In addition, structures of the above-mentioned radio frame, subframe, slot, mini-slot, symbol and the like are only illustrative. For example, it is possible to modify, in various manners, configurations of the number of subframes included in the radio frame, the number of slots per subframe or radio frame, the number of mini-slots included in the slot, the numbers of symbols and RBs included in the slot or mini-slot, the number of subcarriers included in the RB, the number of symbols within the TTI, the symbol length, the cyclic prefix (CP) length and the like.

Further, the information, parameter and the like explained in the present disclosure may be expressed using an absolute value, may be expressed using a relative value from a given value, or may be expressed using another corresponding information. For example, the radio resource may be indicated by a given index.

The names used in the parameter and the like in the present disclosure are not restrictive names in any respects. Further, equations and the like using these parameters may be different from those explicitly disclosed in the disclosure. It is possible to identify various channels (PUCCH, PDCCH, etc.) and information elements, by any suitable names, and therefore, various names assigned to these various channels and information elements are not restrictive names in any respects.

The information, signal and the like explained in the present disclosure may be represented by using any of various different techniques. For example, the data, order, command, information, signal, bit, symbol, chip and the like capable of being described over the entire above-mentioned explanation may be represented by voltage, current, electromagnetic wave, magnetic field or magnetic particle, optical field or photon, or any combination thereof.

Further, the information, signal and the like are capable of being output at least one of from a higher layer to a lower layer, and from the lower layer to the higher layer. The information, signal and the like may be input and output via a plurality of network nodes.

The input/output information, signal and the like may be stored in a particular place (e.g., memory), or may be managed using a management table. The input/output information, signal and the like are capable of being rewritten, updated or edited. The output information, signal and the like may be deleted. The input information, signal and the like may be transmitted to another apparatus.

Notification of the information is not limited to the Aspects/Embodiments described in the present disclosure, and may be performed using another method. For example, notification of the information in the disclosure may be performed using physical layer signaling (e.g., Downlink Control Information (DCI), Uplink Control Information (UCI)), higher layer signaling (e.g., Radio Resource Control (RRC) signaling, broadcast information (Master Information Block (MIB)), System Information Block (SIB) and the like), Medium Access Control (MAC) signaling), other signals, or combination thereof.

In addition, the physical layer signaling may be called Layer 1/Layer 2 (L1/L2) control information (L1/L2 control signal), L1 control information (L1 control signal) and the like. Further, the RRC signaling may be called RRC message, and for example, may be RRC connection setup (RRC Connection Setup) message, RRC connection reconfiguration (RRC Connection Reconfiguration) message, and the like. Furthermore, for example, the MAC signaling may be notified using MAC Control Element (MAC CE).

Further, notification of given information (e.g., notification of "being X") is not limited to explicit notification, and may be performed implicitly (e.g., notification of the given information is not performed, or by notification of different information).

The decision may be made with a value ("0" or "1") expressed by 1 bit, may be made with a Boolean value represented by true or false, or may be made by comparison with a numerical value (e.g., comparison with a given value).

Irrespective of that the software is called software, firmware, middle-ware, micro-code, hardware descriptive term, or another name, the software should be interpreted widely to mean a command, command set, code, code segment, program code, program, sub-program, software module, application, software application, software package, routine, sub-routine, object, executable file, execution thread, procedure, function and the like.

Further, the software, command, information and the like may be transmitted and received via a transmission medium. For example, when the software is transmitted from a website, server or another remote source using at least one of wired techniques (coaxial cable, optical fiber cable, twisted pair, Digital Subscriber Line (DSL) and the like) and wireless techniques (infrared, microwave and the like), at least one of the wired technique and the wireless technique is included in the definition of the transmission medium.

The terms of "system" and "network" used in the present disclosure are capable of being used interchangeably. A "network" may mean an apparatus (e.g., base station) included in the network.

In the present disclosure, the terms of "precoding", "precoder", "weight (precoding weight)", "Quasi-Co-Location (QCL)", "Transmission Configuration Indication state (TCI state)", "spatial relation", "spatial domain filter", "transmit power", "phase rotation", "antenna port", "antenna port group", "layer", "the number of layers", "rank", "resource", "resource set", "resource group", "beam", "beam width", "beam angle", "antenna", "antenna element", "panel" and the like are capable of being used interchangeably.

In the present disclosure, the terms of "Base Station (BS)", "radio base station", "fixed station", "NodeB", "eNB (eNodeB)", "gNB (gNodeB)", "access point", "Transmission Point (TP)", "Reception Point (RP)", "Transmission/Reception Point (TRP)", "panel", "cell", "sector", "cell group", "carrier", "component carrier" and the like are capable of being used interchangeably. There is the case where the base station is called by the terms of macrocell, small cell, femto-cell, pico-cell and the like.

The base station is capable of accommodating one or a plurality of (e.g., three) cells. When the base station accommodates a plurality of cells, the entire coverage area of the base station is capable of being segmented into a plurality of smaller areas, and each of the smaller areas is also capable of providing communication services by abase station subsystem (e.g., small base station (Remote Radio Head (RRH)) for indoor use). The term of "cell" or "sector" refers to a part or the whole of coverage area of at least one of the base station and the base station sub-system that perform communication services in the coverage.

In the present disclosure, the terms of "Mobile Station (MS)", "user terminal", "User Equipment (UE)", "terminal" and the like are capable of being used interchangeably.

There is the case where the Mobile Station may be called using a subscriber station, mobile unit, subscriber unit, wireless unit, remote unit, mobile device, wireless device, wireless communication device, remote device, mobile subscriber station, access terminal, mobile terminal, wireless terminal, remote terminal, handset, user agent, mobile client, client, or some other suitable terms.

At least one of the base station and the mobile station may be called a transmitting apparatus, receiving apparatus, radio communication apparatus and the like. In addition, at least one of the base station and the mobile station may be a device installed in a mobile unit, mobile unit itself and the like. The mobile unit may be a vehicle (e.g., car, airplane, etc.), may be a mobile unit (e.g., drone, self-driving car, etc.) without human intervention, or may be a robot (crewed type or unscrewed type). In addition, at least one of the base station and the mobile station includes an apparatus that does always not move at the time of communication operation. For example, at least one of the base station and the mobile station may be an Internet of Things (IoT) device such as a sensor.

Further, the base station in the present disclosure may be read with the user terminal. For example, each Aspect/Embodiment of the disclosure may be applied to a configuration where communication between the base station and the user terminal is replaced with communication among a plurality of user terminals (for example, which may be called Device-to-Device (D2D), Vehicle-to-Everything (V2X), etc.). In this case, the functions that the above-mentioned base station 10 has may be the configuration that the user terminal 20 has. Further, the words of "up", "down" and the like may be read with a word (e.g., "side") that corresponds to Device-to-Device communication. For example, the uplink channel, downlink channel and the like may be read with a side channel.

Similarly, the user terminal in the present disclosure may be read with the base station. In this case, the functions that the above-mentioned user terminal 20 has may be the configuration that the base station 10 has.

In the present disclosure, operation performed by the base station may be performed by an upper node thereof in some case. In a network including one or a plurality of network nodes having the base station, it is obvious that various operations performed for communication with the terminal are capable of being performed by the base station, one or more network nodes (e.g., Mobility Management Entity (MME), Serving-Gateway (S-GW) and the like are considered, but the disclosure is not limited thereto) except the base station, or combination thereof.

Each Aspect/Embodiment explained in the present disclosure may be used alone, may be used in combination, or may be switched and used according to execution. Further, with respect to the processing procedure, sequence, flowchart and the like of each Aspect/Embodiment explained in the disclosure, unless there is a contradiction, the order may be changed. For example, with respect to the methods explained in the disclosure, elements of various steps are presented in illustrative order, and are not limited to the presented particular order.

Each Aspect/Embodiment explained in the present disclosure may be applied to Long Term Evolution (LTE), LTE-Advanced (LTE-A), LTE-Beyond (LTE-B), SUPER 3G, IMT-Advanced, 4th generation mobile communication system (4G), 5th generation mobile communication system (5G), Future Radio Access (FRA), New-Radio Access Technology (RAT), New Radio (NR), New radio access (NX), Future generation radio access (FX), Global System for Mobile communications (GSM (Registered Trademark)), CDMA 2000, Ultra Mobile Broadband (UMB), IEEE 802.11

(Wi-Fi (Registered Trademark)), IEEE 802.16 (WiMAX (Registered Trademark)), IEEE 802.20, Ultra-WideBand (UWB), Bluetooth (Registered Trademark), system using another proper radio communication method, the next-generation system extended based thereon and the like. Further, a plurality of systems may be combined (e.g., combination of LTE or LTE-A and 5G, etc.) to apply.

The description of "based on" used in the present disclosure does not mean "based on only", unless otherwise specified. In other words, the description of "based on" means both of "based on only" and "based on at least".

Any references to elements using designations of "first", "second" and the like used in the present disclosure do not limit the amount or order of these elements overall. These designations are capable of being used in the disclosure as the useful method to distinguish between two or more elements. Accordingly, references of first and second elements do not mean that only two elements are capable of being adopted, or that the first element should be prior to the second element in any manner.

There is the case where the term of "determining" used in the present disclosure includes various types of operation. For example, "determining" may be regarded as "determining" judging, calculating, computing, processing, deriving, investigating, looking up (searching, inquiring) (e.g., looking up in a table, database or another data structure), ascertaining and the like.

Further, "determining" may be regarded as "determining" receiving (e.g., receiving information), transmitting (e.g., transmitting information), input, output, accessing (e.g., accessing data in memory) and the like.

Furthermore, "determining" may be regarded as "determining" resolving, selecting, choosing, establishing, comparing and the like. In other words, "determining" may be regarded as "determining" some operation.

Still furthermore, "determining" may be read with "assuming", "expecting", "considering" and the like.

The terms of "connected" and "coupled" used in the present disclosure or any modifications thereof mean direct or indirect every connection or coupling among two or more elements, and are capable of including existence of one or more intermediate elements between two mutually "connected" or "coupled" elements. Coupling or connection between elements may be physical, may be logical or may be combination thereof. For example, "connection" may be read with "access".

In the present disclosure, in the case where two elements are connected, it is possible to consider that two elements are mutually "connected" or "coupled", by using one or more electric wires, cable, print electric connection, and as some non-limited and non-inclusive examples, electromagnetic energy having wavelengths in a radio frequency region, microwave region and light (both visible and invisible) region, or the like.

In the present disclosure, the term of "A and B are different" may mean that "A and B are different from each other". In addition, the term may mean that "each of A and B is different from C". The terms of "separate", "coupled" and the like may be similarly interpreted.

In the case of using "include", "including", and modifications thereof in the present disclosure, as in the term of "comprising", these terms are intended to be inclusive. Further, the term of "or" used in the disclosure is intended to be not exclusive OR.

In the present disclosure, in the case where articles are added by translation, for example, as "a", "an" and "the" in English, the disclosure may include that nouns continued from these articles are in the plural.

(Additional Remark)

Supplemental matters of the present disclosure will be added.

A UE that does not have the capability of full-duplex communication is not able to perform transmission and reception simultaneously.

In carrier aggregation (CA) of TDD using the same frequency band or different frequency bands in the case where a UE does not report the given capability information (e.g., simultaneous Rx Tx InterBand CA), UE operation related to determination of slot formats over a plurality of serving cells is not explicitly defined.

In addition, simultaneous Rx Tx InterBand CA may indicate whether or not a UE supports simultaneous reception and transmission in intra-TDD-TDD band CA and intra-TDD-FDD band CA. The above-mentioned given capability information may be capability information on simultaneous reception and transmission in intra-band CA, or may be capability information on simultaneous reception and transmission in inter-band CA. The following description will illustrate an example where the given capability information is capability information on simultaneous reception and transmission in intra-band CA (e.g., simultaneous Rx Tx InterBand CA), but is not limited thereto.

<Outline of Proposals>

In CA operation using the same frequency band or different frequency bands in the case where a UE does not report simultaneous Rx Tx InterBand CA, UE operation for all serving cells in these frequency bands may follow at least one serving cell in a set of these serving cells.

In CA operation using the same frequency band or different frequency bands in the case where a UE does not report simultaneous Rx Tx InterBand CA, UE operation for all sets of serving cells in these frequency bands may follow at least one serving cell among the sets of these serving cells.

<Proposal 1>

For a set of serving cells to which a UE does not report the capability of full duplex, in the case where one or a plurality of symbols of some serving cell is designated as downlink by at least one of TDD-UL-DL-Configuration Common (which may be called common configuration of TDD-UL-DL, first UL-DL information configured by RRC, etc.), TDD-UL-DL-ConfigDedicated (which may be called individual configuration of TDD-UL-DL, second UL-DL information configured by RRC, etc.) and DCI format 2_0 (which may be called DCI format 2_0, DCI format for SFI, etc.), the UE may consider a symbol overlapping the symbol designated as the above-mentioned downlink as downlink, over the above-mentioned serving cell.

In addition, "consider" in the present disclosure may be read with "assume" and the like.

For a set of serving cells to which a UE does not report the capability of full duplex, in the case where one or a plurality of symbols of some serving cell is designated as uplink by at least one of TDD-UL-DL-Configuration Common, TDD-UL-DL-ConfigDedicated and DCI format 2_0, the UE may consider a symbol overlapping the symbol designated as the above-mentioned uplink as uplink, over the above-mentioned serving cell.

As one example of Proposal 1, a symbol of a CC1 is designated as DL by at least one of TDD-UL-DL-Configuration Common, TDD-UL-DL-ConfigDedicated and DCI format 2_0, and a symbol of a CC2 is designated as flexible by at least one of TDD-UL-DL-Configuration Common, TDD-UL-DL-ConfigDedicated and DCI format 2_0, the UE may perform reception of DL in the symbols overlapping each other.

As one example of Proposal 1, a symbol of a CC1 is designated as UL by at least one of TDD-UL-DL-Configuration Common, TDD-UL-DL-ConfigDedicated and DCI format 2_0, and a symbol of a CC2 is designated as flexible by at least one of TDD-UL-DL-Configuration Common, TDD-UL-DL-ConfigDedicated and DCI format 2_0, the UE may perform reception of UL in the symbols overlapping each other.

<Proposal 2>

For a set of serving cells to which a UE does not report the capability of full duplex, in the case where one or a plurality of symbols of all serving cells is designated as flexible by TDD-UL-DL-Configuration Common or TDD-UL-DL-ConfigDedicated (the UE is provided with TDD-UL-DL-Configuration Common or TDD-UL-DL-ConfigDedicated), or the UE is not provided with TDD-UL-DL-Configuration Common or TDD-UL-DL-ConfigDedicated, the UE may operate according to at least one of the following (A) to (D).

(A) The UE does not expect to receive both of dedicated configuring transmission in a set of symbols of the slot on a serving cell and dedicated configuring reception in the set of symbols of the slot on another serving cell.

(B) The UE does not expect to detect both of DCI format 0_0, DCI format 0_1, DCI format 1_0, DCI format 1_1, DCI format 2_3 or Random Access Response (RAR) UL grant for instructing the UE to transmit SRS, PUSCH, PUCCH or PRACH in one or more symbols in a set of symbols of the slot on a serving cell, and DCI format 1_0, DCI format 1_1 or DCI format 0_1 for instructing the UE to receive PDSCH or CSI-RS in the set of symbols of the slot on another serving cell.

(C) In the case of receiving dedicated configuring reception in a set of symbols of the slot on a serving cell, and DCI format 0_0, DCI format 0_1, DCI format 1_0, DCI format 1_1, DCI format 2_3 or RAR UL grant for instructing the UE to transmit SRS, PUSCH, PUCCH or PRACH in one or more symbols in the set of symbols of the slot on another serving cell, the UE transmits the above-mentioned SRS, PUSCH, PUCCH or PRACH in one or more symbols of the set of symbols of the slot.

(D) In the case of receiving dedicated configuring transmission in a set of symbols of the slot on a serving cell, and DCI format 1_0, DCI format 1_1 or DCI format 0_1 for instructing the UE to receive PDSCH or CSI-RS in the set of symbols of the slot on another serving cell, the UE receives the above-mentioned PDSCH or CSI-RS in the set of symbols of the slot.

In addition, in the present disclosure, dedicated configuring transmission may mean transmission configured by a higher layer such as Semi-Persistent Scheduling (SPS) and configured grant (e.g., configured grant PUSCH) or semi-statically. Further, dedicated configuring transmission may mean configuration (configuration information) of transmission configured by such a higher layer or semi-statically (for example, the UE receiving dedicated configuring transmission in the above-mentioned (A) may mean that the UE receives the above-mentioned configuration.)

In addition, in a manner similar to dedicated configuring transmission, dedicated configuring reception also may mean reception configured by the higher layer such as SPS or semi-statically. Further, dedicated configuring reception may mean configuration (configuration information) of reception configured by such a higher layer or semi-statically (for example, the UE receiving dedicated configuring reception in the above-mentioned (A) may mean that the UE receives the above-mentioned configuration.)

Further, the set of symbols of the slot on a serving cell and the set of symbols of the slot on another serving cell in the above-mentioned (A) to (D) may be the set of the same or overlapping symbols.

In addition, in the present disclosure, "flexible is indicated by "TDD-UL-DL-Configuration Common or TDD-UL-DL-ConfigDedicated" and "the UE is not provided with TDD-UL-DL-Configuration Common or TDD-UL-DL-ConfigDedicated" may be read with each another.

As one example of Proposal 2, in the case where the symbol of the CC1 is DL dynamically scheduled and the symbol of the CC2 is UL dynamically scheduled, the UE may assume the case as an error case (which corresponds to the above-mentioned (B)).

In addition, in the present disclosure, in the case of assuming as an error case (or, instead of assuming as an error case), the UE may determine to perform DL reception or UL transmission on one or a plurality of serving cells in the same symbol. For example, in the error case, the UE may determine to perform DL reception or UL transmission on a particular serving cell (e.g., cell low in CC index, cell scheduled earlier or later).

As one example of Proposal 2, in the case where the symbol of the CC1 is dedicated configuring reception and the symbol of the CC2 is dedicated configuring transmission, the UE may assume the case as an error case (which corresponds to the above-mentioned (A)).

As one example of Proposal 2, in the case where the symbol of the CC1 is dedicated configuring transmission or reception, and the symbol of the CC2 is DL or UL dynamically scheduled, the UE may perform communication (DL or UL) of the transmission direction scheduled in the CC2 in the symbols overlapping each other (which corresponds to the above-mentioned (C) and (D)).

<Proposal 3>

For a set of serving cells to which a UE does not report the capability of full duplex, in the case where one or a plurality of symbols of all serving cells is designated as flexible by DCI format 2_0, the UE may operate according to at least one of (A) to (D) described in the above-mentioned Proposal 2.

As one example of Proposal 3, in the case where the symbol of the CC1 is DL dynamically scheduled and the symbol of the CC2 is UL dynamically scheduled, the UE may assume the case as an error case (which corresponds to the above-mentioned (B)).

As one example of Proposal 3, in the case where the symbol of the CC1 is dedicated configuring transmission and the symbol of the CC2 is dedicated configuring reception, the UE may assume the case as an error case (which corresponds to the above-mentioned (A)).

As one example of Proposal 3, in the case where the symbol of the CC1 is dedicated configuring transmission or reception, and the symbol of the CC2 is DL or UL dynamically scheduled, the UE may perform communication (DL or UL) of the transmission direction scheduled in the CC2 in the symbols overlapping each other (which corresponds to the above-mentioned (C) and (D)).

<Proposal 4>

For a set of serving cells to which a UE does not report the capability of full duplex, in the case where one or a plurality of symbols of partial (or a part of) serving cells is designated as flexible by TDD-UL-DL-Configuration Common or TDD-UL-DL-ConfigDedicated (the UE is provided with TDD-UL-DL-Configuration Common or TDD-UL-DL-ConfigDedicated), or the UE is not provided with TDD-UL-DL-Configuration Common or TDD-UL-DL-ConfigDedicated, and in the case where one or a plurality of symbols (which may be the same as or overlap one or a plurality of symbols of the above-mentioned partial serving cells) is designated as flexible by DCI format 2_0, the UE may operate according to at least one of the following (E) to (M).

(E) The UE does not expect to detect both of DCI format 0_0, DCI format 0_1, DCI format 1_0, DCI format 1_1, DCI format 2_3 or Random Access Response (RAR) UL grant for instructing the UE to transmit SRS, PUSCH, PUCCH or PRACH in one or more symbols in a set of symbols of the slot on a serving cell, and DCI format 1_0, DCI format 1_1 or DCI format 0_1 for instructing the UE to receive PDSCH or CSI-RS in the set of symbols of the slot on another serving cell.

(F) In the case of receiving dedicated configuring transmission in the set of symbols of the slot designated as flexible by TDD-UL-DL-Configuration Common or TDD-UL-DL-ConfigDedicated on a serving cell, and dedicated configuring reception in the set of symbols of the slot designated as flexible by DCI format 2_0 on another serving cell, the UE transmits (or, receives configuration) the above-mentioned dedicated configuring transmission in the set of symbols of the slot.

(G) In the case of receiving dedicated configuring reception in the set of symbols of the slot designated as flexible by TDD-UL-DL-Configuration Common or TDD-UL-DL-ConfigDedicated on a serving cell, and dedicated configuring transmission in the set of symbols of the slot designated as flexible by DCI format 2_0 on another serving cell, the UE receives the above-mentioned dedicated configuring reception in the set of symbols of the slot.

(H) In the case of receiving dedicated configuring reception in the set of symbols of the slot designated as flexible by TDD-UL-DL-Configuration Common or TDD-UL-DL-ConfigDedicated on a serving cell, and DCI format 0_0, DCI format 0_1, DCI format 1_0, DCI format 1_1, DCI format 2_3 or RAR UL grant for instructing the UE to transmit SRS, PUSCH, PUCCH or PRACH in one or more symbols in the set of symbols of the slot designated as flexible by DCI format 2_0 on another serving cell, the UE transmits the above-mentioned SRS, PUSCH, PUCCH or PRACH in one or more symbols of the set of symbols of the slot.

(I) In the case of receiving dedicated configuring transmission in the set of symbols of the slot designated as flexible by TDD-UL-DL-Configuration Common or TDD-UL-DL-ConfigDedicated on a serving cell, and DCI format 1_0, DCI format 1_1 or DCI format 0_1 for instructing the UE to receive PDSCH or CSI-RS in the set of symbols of the slot designated as flexible by DCI format 2_0 on another serving cell, the UE receives the above-mentioned PDSCH or CSI-RS in the set of symbols of the slot.

(J) In the case of receiving dedicated configuring transmission in the set of symbols of the slot designated as flexible by DCI format 2_0 on a serving cell, and DCI format 1_0, DCI format 1_1 or DCI format 0_1 for instructing the UE to receive PDSCH or CSI-RS in the set of symbols of the slot designated as flexible by TDD-UL-DL-Configuration Common or TDD-UL-DL-ConfigDedicated on another serving cell, the UE may receive the above-mentioned PDSCH or CSI-RS in the set of symbols of the slot.

(K) The UE does not expect to receive dedicated configuring transmission in the set of symbols of the slot designated as flexible by DCI format 2_0 on a serving cell, and DCI format 1_0, DCI format 1_1 or DCI format 0_1 for instructing the UE to receive PDSCH or CSI-RS in the set of symbols of the slot designated as flexible by TDD-UL-DL-Configuration Common or TDD-UL-DL-ConfigDedicated on another serving cell.

(L) In the case of receiving dedicated configuring reception in the set of symbols of the slot designated as flexible by DCI format 2_0 on a serving cell, and DCI format 0_0, DCI format 0_1, DCI format 1_0, DCI format 1_1, DCI format 2_3 or RAR UL grant for instructing the UE to transmit SRS, PUSCH, PUCCH or PRACH in one or more symbols in the set of symbols of the slot designated as flexible by TDD-UL-DL-Configuration Common or TDD-UL-DL-ConfigDedicated on another serving cell, the UE transmits the above-mentioned SRS, PUSCH, PUCCH or PRACH in one or more symbols of the set of symbols of the slot.

(M) The UE does not expect to receive dedicated configuring reception in the set of symbols of the slot designated as flexible by DCI format 2_0 on a serving cell, and DCI format 0_0, DCI format 0_1, DCI format 1_0, DCI format 1_1, DCI format 2_3 or RAR UL grant for instructing the UE to transmit SRS, PUSCH, PUCCH or PRACH in one or more symbols in the set of symbols of the slot designated as flexible by TDD-UL-DL-Configuration Common or TDD-UL-DL-ConfigDedicated on another serving cell.

As one example of Proposal 4, the following description will be given to the case where the symbol of the CC1 is included in the set of symbols of the slot designated as flexible by TDD-UL-DL-Configuration Common or TDD-UL-DL-ConfigDedicated, and the symbol of the CC2 is included in the set of symbols of the slot designated as flexible by DCI format 2_0.

In the case where the symbol of the CC1 is UL dynamically scheduled and the symbol of the CC2 is DL dynamically scheduled, the UE may assume the case as an error case (which corresponds to the above-mentioned (E)).

In the case where the symbol of the CC1 is dedicated configuring reception, and the symbol of the CC2 is dedicated configuring transmission, the UE may perform the dedicated configuring reception of the CC1 in the symbols overlapping each other (which corresponds to the above-mentioned (F) and (G)).

In the case where the symbol of the CC1 is dedicated configuring transmission or reception, and the symbol of the CC2 is DL or UL dynamically scheduled, the UE may perform communication (DL or UL) of the transmission direction scheduled in the CC2 in the symbols overlapping each other (which corresponds to the above-mentioned (H) and (I)).

In the case where the symbol of the CC1 is DL or UL dynamically scheduled and the symbol of the CC2 is dedicated configuring transmission or reception, the UE may perform communication (DL or UL) of the transmission direction scheduled in the C1 in the symbols overlapping each other or may assume as an error case (which corresponds to the above-mentioned (J) to (M)).

As described above, the invention according to the present disclosure is described in detail, but it is obvious to a person skilled in the art that the invention according to the disclosure is not limited to the Embodiments described in the disclosure. The invention according to the disclosure is capable of being carried into practice as modified and changed aspects without departing from the subject matter and scope of the invention defined by the descriptions of the scope of the claims. Accordingly, the descriptions of the disclosure are intended for illustrative explanation, and do not provide the invention according to the disclosure with any restrictive meaning.

The present application is based on Japanese Patent Application No. 2018-228549 filed on Nov. 16, 2018, entire content of which is expressly incorporated by reference herein.

The invention claimed is:

1. A terminal comprising:
receiver that receives slot format information indicating a slot format of a cell; and
a processor that determines, based on the slot format information, a slot format in a cell,
wherein, when a half-duplex operation is applied among multiple cells, the processor controls, in a symbol corresponding to the slot format of each cell, not to perform transmission or reception in different directions on a first cell and a second cell, or does not assume, in the symbol, that the transmission or reception is indicated, the slot format being determined based on the slot format information, and
wherein when transmission or reception in the symbol is indicated to the first cell by first downlink control information, the processor does not assume that transmission or reception in a direction that is different from the first cell is indicated to the second cell by second downlink control information in the symbol.

2. The terminal according to claim 1, wherein when transmission or reception in the symbol, which is flexibly configured, is configured by higher layer signaling for the first cell, and transmission or reception in a direction that is different from the first cell is indicated, by downlink control information, to the second cell in the symbol, the processor controls not to perform transmission or reception on the first cell.

3. The terminal according to claim 1, wherein the first cell is a cell with a smallest index.

4. A radio communication method for a terminal, comprising:
receiving slot format information indicating a slot format of a cell; and
determining, based on the slot format information, a slot format in a cell,
wherein, when a half-duplex operation is applied among multiple cells, transmission or reception in different directions on a first cell and a second cell is not performed in a symbol corresponding to the slot format of each cell, or the transmission or reception is not assumed to be indicated in the symbol, the slot format being determined based on the slot format information, and
wherein when transmission or reception in the symbol is indicated to the first cell by first downlink control information, the terminal does not assume that transmission or reception in a direction that is different from the first cell is indicated to the second cell by second downlink control information in the symbol.

5. A system comprising a terminal and a base station, wherein
the terminal comprises:
a receiver that receives slot format information indicating a slot format of a cell; and
a processor that determines, based on the slot format information, a slot format in a cell,
wherein, when a half-duplex operation is applied among multiple cells, the processor controls, in a symbol corresponding to the slot format of each cell, not to perform transmission or reception in different directions on a first cell and a second cell, or does not assume, in the symbol, that the transmission or reception is indicated, the slot format being determined based on the slot format information, and
wherein when transmission or reception in the symbol is indicated to the first cell by first downlink control information, the processor does not assume that transmission or reception in a direction that is different from the first cell is indicated to the second cell by second downlink control information in the symbol, and
the base station comprises:
a transmitter that transmits the slot format information.

* * * * *